(12) United States Patent
Yashiro et al.

(10) Patent No.: US 11,600,079 B2
(45) Date of Patent: Mar. 7, 2023

(54) VEHICLE CONTROL DEVICE, VEHICLE CONTROL METHOD, AND PROGRAM

(71) Applicant: HONDA MOTOR CO., LTD., Tokyo (JP)

(72) Inventors: Katsuya Yashiro, Wako (JP); Ayumu Horiba, Wako (JP); Tadahiko Kanoh, Wako (JP); Chihiro Oguro, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 282 days.

(21) Appl. No.: 16/917,995

(22) Filed: Jul. 1, 2020

(65) Prior Publication Data

US 2021/0004615 A1 Jan. 7, 2021

(30) Foreign Application Priority Data

Jul. 4, 2019 (JP) .............................. JP2019-125438

(51) Int. Cl.
*G06V 20/58* (2022.01)
*G08G 1/01* (2006.01)
*B60W 10/18* (2012.01)
*B60W 10/20* (2006.01)
*G06V 20/56* (2022.01)

(52) U.S. Cl.
CPC ........... *G06V 20/582* (2022.01); *B60W 10/18* (2013.01); *B60W 10/20* (2013.01); *G06V 20/588* (2022.01); *G08G 1/0145* (2013.01)

(58) Field of Classification Search
CPC .... B60W 10/18; B60W 10/20; G06V 20/588; G08G 1/0145
See application file for complete search history.

(56) References Cited

U.S. PATENT DOCUMENTS

| | | | |
|---|---|---|---|
| 2016/0200321 A1* | 7/2016 | Yamada | B60W 10/18 701/96 |
| 2017/0160744 A1* | 6/2017 | Chia | B60W 30/12 |

(Continued)

FOREIGN PATENT DOCUMENTS

| | | |
|---|---|---|
| JP | 2007-280132 | 10/2007 |
| JP | 5062137 | 10/2012 |

(Continued)

OTHER PUBLICATIONS

Japanese Office Action for Japanese Patent Application No. 2019-125438 dated Mar. 9, 2021.

*Primary Examiner* — Thomas Ingram
(74) *Attorney, Agent, or Firm* — Amin, Turocy & Watson, LLP

(57) ABSTRACT

A vehicle control device includes: a recognizer configured to recognize a surrounding situation of a vehicle; and a driving controller configured to control a speed and steering of the vehicle according to a recognition result of the recognizer. The driving controller is configured to stop following travel of following a front vehicle recognized by the recognizer according to a state of a target recognized by the recognizer in a traveling region through which the front vehicle has passed when the following travel is performed. The target is a regulation sign for regulating a part of a lane in which a vehicle is traveling, a regulation sign for regulating a lane, or a guiding sign for guiding a visual line of an occupant of the vehicle.

17 Claims, 13 Drawing Sheets

(56) References Cited

U.S. PATENT DOCUMENTS

| | | | |
|---|---|---|---|
| 2018/0065630 A1* | 3/2018 | Tamura | B60W 30/16 |
| 2019/0101917 A1* | 4/2019 | Yao | B60W 50/14 |
| 2019/0337513 A1* | 11/2019 | Kim | B60W 30/165 |
| 2020/0072617 A1* | 3/2020 | Tanaka | G01C 21/28 |

FOREIGN PATENT DOCUMENTS

| | | |
|---|---|---|
| JP | 2014-058229 | 4/2014 |
| WO | 2018/179359 | 10/2018 |

* cited by examiner

VEHICLE CONTROL DEVICE, VEHICLE CONTROL METHOD, AND PROGRAM

CROSS-REFERENCE TO RELATED APPLICATION

Priority is claimed on Japanese Patent Application No. 2019-125438, filed Jul. 4, 2019, the content of which is incorporated herein by reference.

BACKGROUND

Field of the Invention

The present invention relates to a vehicle control device, a vehicle control method, and a storage medium.

Description of Related Art

In the related art, a traveling control device that causes a vehicle to follow a front vehicle is disclosed. The traveling control device performs control such that a vehicle follows a front vehicle when contact between a brake pedal and a foot is detected (for example, Japanese Patent No. 5062137).

SUMMARY

The foregoing traveling control device is a device that performs following control based on whether a brake pedal comes into contact with a foot, and conditions for performing the following control are restrictive. In the foregoing traveling control device, a surrounding situation of a vehicle is not considered in some cases when the following control is performed.

The present invention is devised in view of such circumstances and an objective of the present invention is to provide a vehicle control device, a vehicle control method, and a storage medium capable of realizing control of a vehicle in further accordance with a surrounding situation.

A vehicle control device, a vehicle control method, and a storage medium according to the present invention adopt the following configurations.

(1) According to an aspect of the present invention, a vehicle control device includes: a recognizer configured to recognize a surrounding situation of a vehicle; and a driving controller configured to control a speed and steering of the vehicle according to a recognition result of the recognizer. The driving controller is configured to stop following travel of following a front vehicle recognized by the recognizer according to a state of a target recognized by the recognizer in a traveling region through which the front vehicle has passed when the following travel is performed. The target is a regulation sign for regulating a part of a lane in which a vehicle is traveling, a regulation sign for regulating a lane, or a guiding sign for guiding a visual line of an occupant of the vehicle.

(2) In the vehicle control device according to the aspect (1), the recognizer may determine whether a captured image is in a predetermined state by inputting the captured image to a learned model. The driving controller may stop the following travel when the recognizer determines that the captured image is in the predetermined state. The learned model may be a model learned so that information indicating that the captured image is in the predetermined state is output when the captured image including the target in the predetermined state is input.

(3) In the vehicle control device according to the aspect (1) or (2), the driving controller may stop the following travel when the state of the target recognized by the recognizer in the traveling region through which the front vehicle has passed is different from the state of the target recognized by the recognizer immediately before the front vehicle passes.

(4) In the vehicle control device according to any one of the aspects (1) to (3), the state of the target recognized by the recognizer in the traveling region through which the front vehicle has passed may be a state in which the target is moving or a state in which the target stops a different position from a position at which the target is located.

(5) In the vehicle control device according to any one of the aspects (1) to (4), the target may be a target that is temporarily disposed on a road and is not stored in map information referred to by the vehicle.

(6) In the vehicle control device according to any one of the aspects (1) to (5), the driving controller may be able to perform first control in which a position of the vehicle in a horizontal direction is controlled according to a road mark line along which the vehicle is traveling and second control in which the position of the vehicle in the horizontal direction is controlled according to the front vehicle. The driving controller may not stop the following travel according to the state of the target recognized by the recognizer in the traveling region through which the front vehicle has passed when the driving controller is configured to perform the first control. The driving controller may stop the following travel according to the state of the target recognized by the recognizer in the traveling region through which the front vehicle has passed when the driving controller performs the second control.

(7) In the vehicle control device according to the aspect (6), an inter-vehicle distance between the vehicle and the front vehicle maintained by the vehicle in the second control may be longer than an inter-vehicle distance between the vehicle and the front vehicle maintained by the vehicle in the first control.

(8) In the vehicle control device according to any one of the aspects (1) to (7), the driving controller may perform third travel control in which grasping of an operator of the vehicle by an occupant of the vehicle is a condition when the than inter-vehicle distance following travel performed irrespective of whether the occupant of the vehicle grasps the operator of the vehicle is performed and the following travel is stopped according to the state of the target recognized by the recognizer in the traveling region through which the front vehicle has passed.

(9) In the vehicle control device according to any one of the aspects (1) to (8), the driving controller may not stop the following travel when a size of the target is equal to or less than a predetermined size.

(10) In the vehicle control device according to the aspect (9), the predetermined size or less may be a size which is according to a distance between a road and a lower portion of a body of the vehicle.

(11) In the vehicle control device according to any one of the aspects (1) to (10), the target may be a target that has a region of which light reflection intensity is equal to or greater than a threshold, a target that has a region of which light reflection intensity is higher by a predetermined degree or more than another region of the target, or a target that has a reflector.

(12) According to another aspect of the present invention, there is provided a vehicle control method causing a computer to perform: recognizing a surrounding situation of a vehicle; controlling a speed and steering of the vehicle according to a recognition result; and stopping following travel of following a recognized front vehicle according to a recognized state of a target in a traveling region through which the front vehicle has passed when the following travel is performed. The target is a regulation sign for regulating a part of a lane in which a vehicle is traveling, a regulation sign for regulating a lane, or a guiding sign for guiding a visual line of an occupant of the vehicle.

(13) According to still another aspect of the present invention, there is provided a non-transitory computer-readable storage medium that stores a computer program to be executed by a computer to perform at least: recognizing a surrounding situation of a vehicle; controlling a speed and steering of the vehicle according to a recognition result; and stopping following travel of following a recognized front vehicle according to a recognized state of a target in a traveling region through which the front vehicle has passed when the following travel is performed. The target is a regulation sign for regulating a part of a lane in which a vehicle is traveling, a regulation sign for regulating a lane, or a guiding sign for guiding a visual line of an occupant of the vehicle.

According to the aspect (1) to (13), it is possible to realize control of a vehicle in further accordance with a surrounding situation.

DETAILED DESCRIPTION

Hereinafter, an embodiment of a vehicle control device, a vehicle control method, and a storage medium according to the present invention will be described with reference to the drawings. Hereinafter, countries or areas where laws and regulations for left-hand traffic are applied will be assumed in description. However, when laws and regulations for right-hand traffic are applied, the left and right may be reversed.

First Embodiment

[Overall Configuration]

Figure 1:
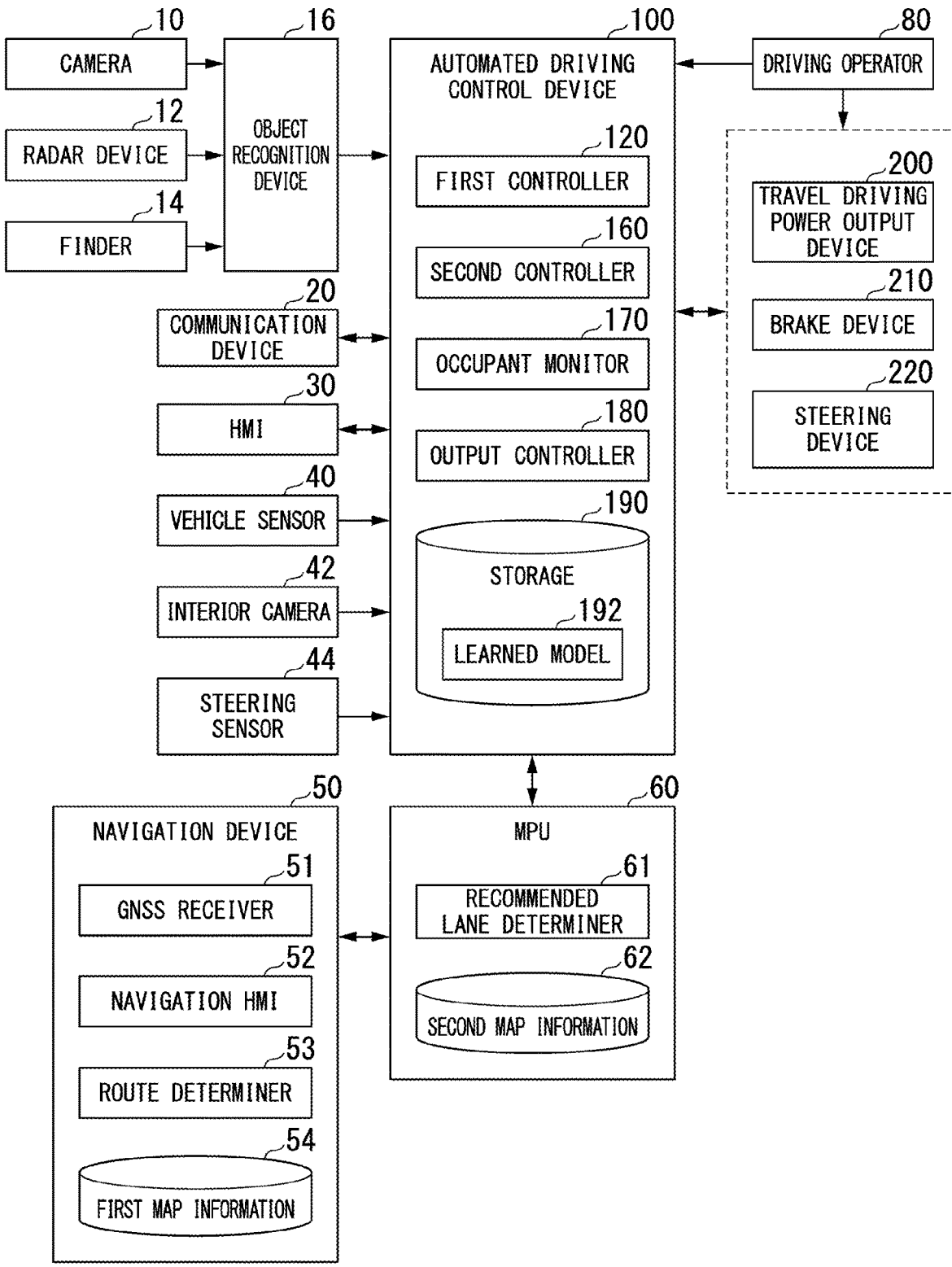
FIG. 1 is a diagram showing a configuration of a vehicle system in which a vehicle control device according to a first embodiment is used.

FIG. 1 is a diagram showing a configuration of a vehicle system 1 in which a vehicle control device according to a first embodiment is used. A vehicle in which the vehicle system 1 is mounted is, for example, a vehicle such as a two-wheeled vehicle, a three-wheeled vehicle, or a four-wheeled vehicle. A driving source of the vehicle includes an internal combustion engine such as a diesel engine or a gasoline engine, an electric motor, or a combination thereof. The electric motor operates using power generated by a power generator connected to the internal combustion engine or power discharged from a secondary cell or a fuel cell.

The vehicle system 1 includes, for example, a camera 10, a radar device 12, a finder 14, an object recognition device 16, a communication device 20, a human machine interface (HMI) 30, a vehicle sensor 40, an interior camera 42, a steering sensor 44, a navigation device 50, a map positioning unit (MPU) 60, a driving operator 80, an automated driving control device 100, a travel driving power output device 200, a brake device 210, and a steering device 220. The devices and units are connected to one another via a multiplex communication line such as a controller area network (CAN) communication line, a serial communication line, or a wireless communication network. The configuration shown in FIG. 1 is merely an exemplary example, a part of the configuration may be omitted, and another configuration may be further added.

The camera 10 is, for example, a digital camera that uses a solid-state image sensor such as a charged coupled device (CCD) or a complementary metal oxide semiconductor (CMOS). The camera 10 is mounted on any portion of a vehicle in which the vehicle system 1 is mounted (hereinafter referred to as a vehicle M). When the camera 10 images a front side, the camera 10 is mounted on an upper portion of a front windshield, a rear surface of a rearview mirror, or the like. When the camera 10 images a rear side, the camera 10 is mounted on an upper portion of a rear windshield or the like. For example, the camera 10 repeatedly images the surroundings of the vehicle M periodically. The camera 10 may be a stereo camera.

The radar device 12 radiates radio waves such as millimeter waves to the surroundings of the vehicle M and detects radio waves (reflected waves) reflected from an object to detect at least a position (a distance from and an azimuth of) of the object. The radar device 12 is mounted on any portion of the vehicle M. The radar device 12 may detect a position and a speed of an object in conformity with a frequency modulated continuous wave (FM-CW) scheme.

The finder 14 is a light detection and ranging (LIDAR) finder. The finder 14 radiates light to the surroundings of the vehicle M and measures scattered light. The finder 14 detects a distance to a target based on a time from light emission to light reception. The radiated light is, for example, pulsed laser light. The finder 14 is mounted on any portion of the vehicle M.

The object recognition device 16 performs a sensor fusion process on detection results from some or all of the camera 10, the radar device 12, and the finder 14 and recognizes a position, a type, a speed, and the like of an object. The object recognition device 16 outputs a recognition result to the automated driving control device 100. The object recognition device 16 may output detection results of the camera 10, the radar device 12, and the finder 14 to the automated driving control device 100 without any change. The object recognition device 16 may be excluded from the vehicle system 1.

The communication device 20 communicates with another vehicle around the vehicle M using, for example, a cellular network, a Wi-Fi network, Bluetooth (registered trademark), dedicated short range communication (DSRC) or the like or communicates with various server devices via radio base stations.

The HMI 30 presents various types of information to occupants of the vehicle M and receives input operations by the occupants. The HMI 30 includes various display devices, speakers, buzzers, touch panels, switches, and keys.

The vehicle sensor 40 includes a vehicle speed sensor that detects a speed of the vehicle M, an acceleration sensor that detects acceleration, a yaw rate sensor that detects angular velocity around a vertical axis, and an azimuth sensor that detects a direction of the vehicle M.

The interior camera 42 is, for example, a digital camera in which a solid-state image sensor such as a CCD or a CMOS is used. The interior camera 42 may be a stereo camera. The interior camera 42 is fitted in any portion inside the vehicle M. The interior camera 42 images a region including a driver seat inside the vehicle. That is, the interior camera 42 images an occupant sitting on the driver seat. The interior camera 42 repeatedly images the region periodically.

The steering sensor 44 is provided at a predetermined position of a steering wheel. For example, a plurality of steering sensors are provided in the steering wheel. The predetermined position is, for example, a portion which is operated (grasped or touched) by a driver such as a rim portion or the like. The steering sensor 44 is, for example, a sensor that detects a change in electrostatic capacitance.

The navigation device 50 includes, for example, a global navigation satellite system (GNSS) receiver 51, a navigation HMI 52, and a route determiner 53. The navigation device 50 retains first map information 54 in a storage device such as a hard disk drive (HDD) or a flash memory. The GNSS receiver 51 specifies a position of the vehicle M based on signals received from GNSS satellites. The position of the vehicle M may be specified or complemented by an inertial navigation system (INS) using an output of the vehicle sensor 40. The navigation HMI 52 includes a display device, a speaker, a touch panel, and a key. The navigation HMI 52 may be partially or entirely common to the above-described HMI 30. The route determiner 53 determines, for example, a route from a position of the vehicle M specified by the GNSS receiver 51 (or any input position) to a destination input by an occupant using the navigation HMI 52 (hereinafter referred to as a route on a map) with reference to the first map information 54. The first map information 54 is, for example, information in which a road shape is expressed by links indicating roads and nodes connected by the links. The first map information 54 may include curvatures of roads and point of interest (POI) information. The route on the map is output to the MPU 60. The navigation device 50 may perform route guidance using the navigation HMI 52 based on the route on the map. The navigation device 50 may be realized by, for example, a function of a terminal device such as a smartphone or a tablet terminal possessed by an occupant. The navigation device 50 may transmit a present position and a destination to a navigation server via the communication device 20 to acquire the same route as the route on the map from the navigation server.

The MPU 60 includes, for example, a recommended lane determiner 61 and retains second map information 62 in a storage device such as an HDD or a flash memory. The recommended lane determiner 61 divides the route on the map provided from the navigation device 50 into a plurality of blocks (for example, divides the route in a vehicle movement direction for each 100 [m]) and determines a recommended lane for each block with reference to the second map information 62. The recommended lane determiner 61 determines in which lane the vehicle travels from the left. When there is a branching location in the route on the map, the recommended lane determiner 61 determines a recommended lane so that the vehicle M can travel in a reasonable route to move to a branching destination.

The second map information 62 is map information that has higher precision than the first map information 54. The second map information 62 includes, for example, information regarding the middles of lanes or information regarding boundaries of lanes. The second map information 62 may include road information, traffic regulation information, address information (address and postal number), facility information, and telephone number information. The second map information 62 may be updated frequently by communicating with another device using the communication device 20.

The driving operator 80 includes, for example, an accelerator pedal, a brake pedal, a shift lever, a steering wheel, a heteromorphic steering wheel, a joystick, a turn signal lever, a microphone, and various switches. A sensor that detects whether there is an operation or an operation amount is mounted in the driving operator 80 and a detection result is output to the automated driving control device 100 or some or all of the travel driving power output device 200, the brake device 210, and the steering device 220.

The automated driving control device 100 includes, for example, a first controller 120, a second controller 160, an occupant monitor 170, an output controller 180, and a storage 190. Each of the first controller 120, the second controller 160, and the occupant monitor 170 is realized, for example, by causing a hardware processor such as a central processing unit (CPU) to execute a program (software). Some or all of the constituent elements may be realized by hardware (a circuit unit including circuitry) such as a large scale integration (LSI), an application specific integrated circuit (ASIC), a field-programmable gate array (FPGA), or a graphics processing unit (GPU) or may be realized by software and hardware in cooperation. The program may be stored in advance in a storage device such as an HDD or a flash memory of the storage 190 or may be stored in a detachably mounted storage medium such as a DVD, a CD-ROM, or the like so that the storage medium is mounted on a drive device to be installed on the HDD or the flash memory of the automated driving control device 100. The storage 190 stores a learned model 192. The details of the learned model 192 will be described later.

The occupant monitor 170 determines whether an occupant (an occupant sitting on a driver seat) monitors surroundings of the vehicle. The occupant monitor 170 analyzes images captured by the interior camera 42 and derives a direction of the face or a direction of a visual line of the driver based on an analysis result. For example, the occupant monitor 170 determines that the occupant monitors the surroundings when the occupant monitor 170 determines that the derived direction of the face or the derived direction of the visual line is within a standard range.

The occupant monitor 170 determines whether the driver operates or grasps the steering wheel. The occupant monitor 170 determines whether a hand of the driver comes into contact with the steering wheel. The occupant monitor 170 acquires a detection result detected by the steering sensor 44 and determines whether the steering wheel is operated based on the acquired detection result. For example, the occupant monitor 170 compares a detection value of the steering sensor 44 acquired at a first time with a detection value of the steering sensor 44 acquired at a second time and determines that the driver operates the steering wheel when the detection value is changed by a threshold value or more. The occupant monitor 170 may determine that the driver operates the steering wheel when the acquired detection value of the steering sensor 44 is within a predetermined range. The occupant monitor 170 may determine whether the driver operates the steering wheel in consideration of the analysis result of the images acquired by the interior camera 42.

Figure 2:
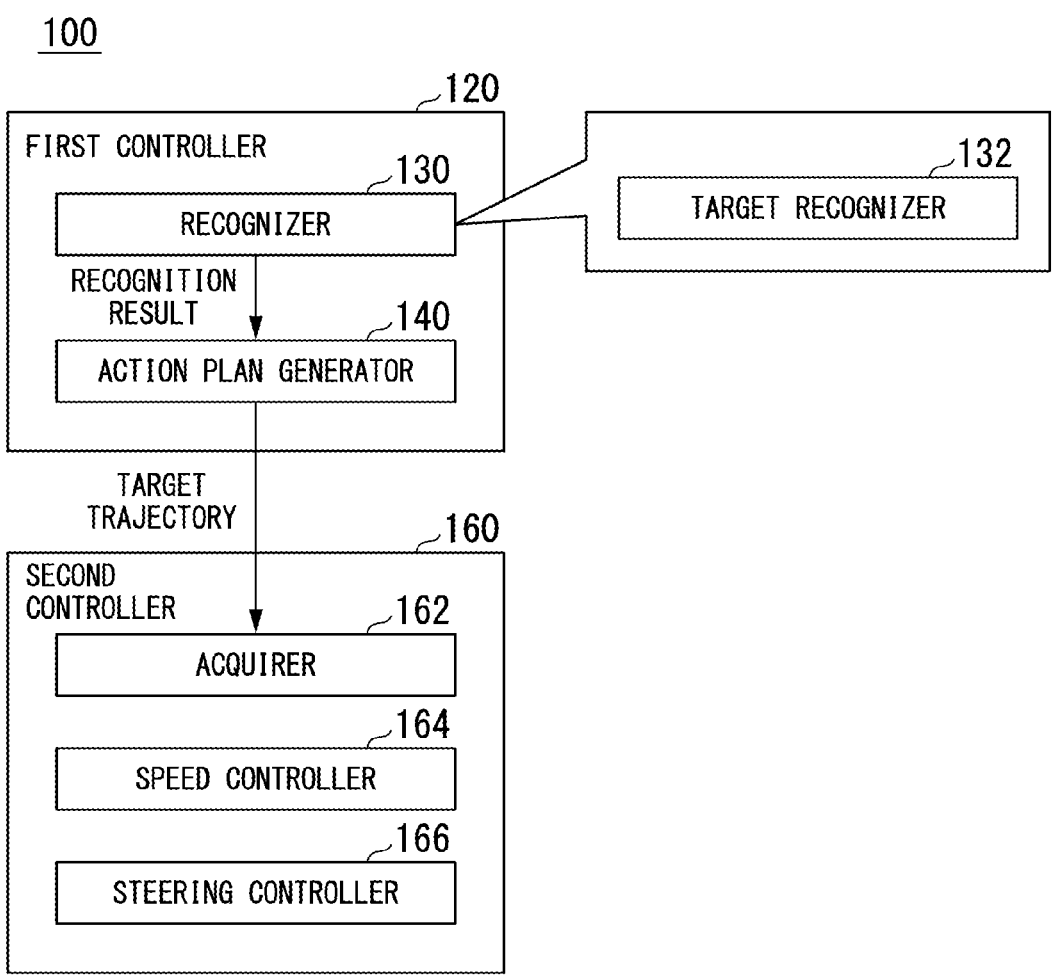
FIG. 2 is a diagram showing a functional configuration of a first controller and a second controller.

FIG. 2 is a diagram showing a functional configuration of the first controller 120 and the second controller 160. The first controller 120 includes, for example, a recognizer 130 and an action plan generator 140. The recognizer 130 realizes, for example, a function by artificial intelligence (AI) and a function by a model given in advance in parallel. For example, a function of "recognizing an intersection" may be realized by performing recognition of an intersection by deep learning or the like and recognition based on a condition given in advance (a signal, a road sign, or the like which can be subjected to pattern matching) in parallel, scoring both the recognitions, and performing evaluation comprehensively. Thus, reliability of automated driving is guaranteed.

The recognizer 130 recognizes states such as a position, a speed, acceleration, or the like of an object near the vehicle M based on information input from the camera 10, the radar device 12, and the finder 14 via the object recognition device 16. The object includes another vehicle. For example, the position of the object is recognized as a position on the absolute coordinates in which a representative point (a center of gravity, a center of a driving shaft, or the like) of the vehicle M is the origin and is used for control. The position of the object may be represented as a representative point such as a center of gravity, a corner, or the like of the object or may be represented as expressed regions. A "state" of an object may include acceleration or jerk of the object or an "action state" (for example, whether a vehicle is changing a lane or is attempting to change the lane).

The recognizer 130 recognizes, for example, a lane in which the vehicle M is traveling (a traveling lane).

For example, the recognizer 130 recognizes the traveling lane by comparing patterns of road mark lines (for example, arrangement of continuous lines and broken lines) obtained from the second map information 62 with patterns of road mark lines around the vehicle M recognized from images captured by the camera 10. The recognizer 130 may recognize a traveling lane by recognizing runway boundaries (road boundaries) including road mark lines or shoulders, curbstones, median strips, and guardrails without being limited to road mark lines. In this recognition, the position of the vehicle M acquired from the navigation device 50 or a process result by INS may be considered. The recognizer 130 recognizes temporary stop lines, obstacles, red signals, toll gates, and other road events.

The recognizer 130 recognizes a position or a posture of the vehicle M in the traveling lane when the recognizer 130 recognizes the traveling lane. For example, the recognizer 130 may recognize a deviation from the middle of a lane of the representative point of the vehicle M and an angle formed with a line extending along the middle of a lane in the traveling direction of the vehicle M as a relative position and posture of the vehicle M to the traveling lane. Instead of this, the recognizer 130 may recognize a position or the like of the representative point of the vehicle M with respect to any side end portion (a road mark line or a road boundary) of a traveling lane as the relative position of the vehicle M to the traveling lane.

The recognizer 130 includes, for example, a target recognizer 132. The target recognizer 132 recognizes a specific target based on an image captured by the camera 10. The "specific target" is, for example, a regulation sign for regulating a part of a lane in which the vehicle M is traveling, a regulation sign for regulating a lane, or a guiding sign for guiding a visual line of an occupant of the vehicle M. The "specific target" is, for example, an object that is not stored in map information which is referred to by the vehicle M. The "specific target" may be, for example, an object that has a specific region of which light reflection intensity is equal to or greater than a threshold, a specific region of which light reflection intensity is higher by the degree equal to or greater than a predetermined degree than the other region (a region different from the specific region) of the specific object, or a reflector (a reflection plate). The region in which the reflector is provided is a region of which light reflection intensity is equal to or greater than a threshold. The map information to be referred to includes map information stored in a storage device of the vehicle M or map information supplied by a server device via a network.

The target recognizer 132 analyzes an image and recognizes a specific target (object) in the image and a position of the specific target on the image. The target recognizer 132 extracts a region including the specific target on the image and inputs an image of the extracted region to the learned model 192. Based on an output result output by the learned model 192, the target recognizer 132 recognizes whether the specific target is included in the image. The target recognizer 132 may recognize a specific region of which light reflection intensity is equal to or greater than the threshold or a specific region in which a reflector is provided and may recognize a target that has the specific region as a specific target. The target recognizer 132 recognizes a specific region based on a luminance gradient in image processing or a process performed using the learned model 192, as described above.

The action plan generator 140 generates a target trajectory along which the vehicle M travels in future automatedly (irrespective of an operation by a driver) so that the vehicle M is traveling along a recommended lane determined by the recommended lane determiner 61 in principle and can handle a surrounding situation of the vehicle M. The target trajectory includes, for example, a speed component. For example, the target trajectory is expressed by arranging spots (trajectory points) at which the vehicle M will arrive in sequence. The trajectory point is a spot at which the vehicle M will arrive for each predetermined traveling distance (for example, about several [m]) in a distance along a road. Apart from the trajectory points, target acceleration and a target speed are generated as parts of the target trajectory for each of predetermined sampling times (for example, about every fractions of a second). The trajectory point may be a position at which the vehicle M will arrive at the sampling time for each predetermined sampling time. In this case, information regarding the target acceleration or the target speed is expressed according to an interval between the trajectory points.

The action plan generator 140 may set an automated driving event when the target trajectory is generated. As the automated driving event, there are a constant speed traveling event, a following travel event in which a vehicle follows a front vehicle m to travel at a predetermined vehicle speed (for example, 60 [km]) or less, a lane changing event, a branching event, a joining event, a takeover event, and the like. The action plan generator 140 generates the target trajectory in accordance with an activated event.

For example, the action plan generator 140 controls a vehicle in one driving state among first, second, and third driving states. The first, second, and third driving states are driving states in which the degrees of automation of control on a vehicle are high in this order. In other words, the fact that the degree of automation is high means that the degree of control on a vehicle is low based on the degree of operation on a vehicle of an occupant or a task for monitoring surroundings of a vehicle requested to an occupant is low. Hereinafter, examples of the first to third driving states will be described.

The first driving state is a driving state in which it is not necessary for an occupant to monitor surroundings of a vehicle and operate a steering wheel. The first driving state is, for example, a driving state in which the vehicle can control its speed and steering automatedly in a state in which an occupant does not operate a steering wheel (the occupant does not grasp, maintain, or touch the steering wheel) and the occupant does not monitor the surroundings of the vehicle. Even in a case in which the occupant monitors the surroundings of the vehicle, the occupant grasps the steering wheel, or the occupant monitors the surroundings of the vehicle and grasps the steering wheel, the first driving state is performed or maintained when other conditions that the first driving state can be performed are satisfied.

The second driving state is a driving state in which it is necessary for an occupant to monitor surroundings of a vehicle and it is not necessary for the occupant to operate a steering wheel. The second driving state is a driving state in which the vehicle can control its speed and steering automatedly in a state in which the occupant monitors the surroundings of the vehicle and the occupant does not operate the steering wheel. In a case in which the occupant monitors the surroundings of the vehicle and other conditions that the second driving state can be performed are satisfied, the second driving state is performed or maintained when the occupant grasps the steering wheel or does not grasp the steering wheel.

The third driving state is, for example, a driving state in which at least a monitoring task related to safety driving of the surroundings (front side gazing or the like) is imposed on a driver. The third driving state is, for example, a driving state in which the vehicle can control its speed and steering automatedly when the occupant operates the steering wheel and the occupant monitors the surroundings of the vehicle.

The third driving state may be a state in which a driver performs manual driving. The third driving state may be a state in which an advanced driver assistance system (ADAS) is operating. The ADAS is a driving support system typified by an adaptive cruise control system (ACC) or a lane keeping assist system (LKAS).

In the first to third driving states, for example, following travel may be performed to follow a front vehicle m traveling in front of the vehicle M. The following travel is control in which the vehicle M follows the front vehicle m while maintaining an inter-vehicle distance between the vehicle M and the front vehicle m by a predetermined distance (for example, a predetermined distance in accordance with a speed). When the front vehicle m which is a following target is not located in the driving state in which the following travel is performed, the following control is cancelled. In this case, a process of transitioning to a driving state in which the degree of automation (the degree of automated control) is lower than the driving state in which the following control is performed (in other words, the driving state in which the degree of operation of the driver is higher than the degree of automated control) is performed. For example, as the process of transitioning to the driving state in which the degree of automation is lower, a notification for requesting the driver to monitor the surroundings, a notification for requesting the driver to grasp the steering wheel, or the like is performed by the HMI 30. As a case in which the front vehicle m which is the following target is not located, the front vehicle m moves in a direction different from a traveling direction of the vehicle M or moves to a different lane.

The conditions for controlling the first to third driving states are exemplary and may be set arbitrarily as long as the degree of automation of the vehicle is higher in the order of the first driving state, the second driving state, and the third driving state. For example, some or all of the first to third driving states may be automated driving states or some or all of the first to third driving states may be states in which driving support is performed rather than the automated driving states. Instead of three driving states, the embodiment may be applied to two or more driving states.

The second controller 160 controls the travel driving power output device 200, the brake device 210, and the steering device 220 so that the vehicle M passes along the target trajectory generated by the action plan generator 140 at a scheduled time. A combination of the action plan generator 140 and the second controller 160 is an example of a "driving controller."

The second controller 160 includes, for example, an acquirer 162, a speed controller 164, and a steering controller 166. The acquirer 162 acquires information regarding a target trajectory (trajectory points) generated by the action plan generator 140 and stores the information in a memory (not shown). The speed controller 164 controls the travel driving power output device 200 or the brake device 210 according to a speed element incidental to the target trajectory stored in the memory. The steering controller 166 controls the steering device 220 in accordance with a curve state of the target trajectory stored in the memory. Processes of the speed controller 164 and the steering controller 166 are realized, for example, by combining feed-forward control and feedback control. For example, the steering controller 166 performs the feed-forward control in accordance with a curvature of a road in front of the vehicle M and the feedback control based on separation from the target trajectory in combination.

Referring back to FIG. 1, the output controller 180 causes the HMI 30 to perform, for example, a predetermined notification. The predetermined notification is a notification for requesting an occupant to grasp the steering wheel or a notification for requesting an occupant to monitor surroundings.

The travel driving power output device 200 outputs a travel driving power (torque) for traveling the vehicle to a driving wheel. The travel driving power output device 200 includes, for example, a combination of an internal combustion engine, an electric motor, and a transmission and an ECU controlling them. The ECU controls the foregoing configuration in accordance with information input from the second controller 160 or information input from the driving operator 80.

The brake device 210 includes, for example, a brake caliper, a cylinder that transmits a hydraulic pressure to the brake caliper, an electronic motor that generates a hydraulic pressure in the cylinder, and a brake ECU. The brake ECU controls the electric motor in accordance with information input from the second controller 160 or information input from the driving operator 80 such that a brake torque in accordance with a brake operation is output to each wheel. The brake device 210 may include a mechanism that transmits a hydraulic pressure generated in response to an operation of the brake pedal included in the driving operator 80 to the cylinder via a master cylinder as a backup. The brake device 210 is not limited to the above-described configuration and may be an electronic control type hydraulic brake device that controls an actuator in accordance with information input from the second controller 160 such that a hydraulic pressure of the master cylinder is transmitted to the cylinder.

The steering device 220 includes, for example, a steering ECU and an electric motor. The electric motor works a force to, for example, a rack and pinion mechanism to change a direction of a steering wheel. The steering ECU drives the electric motor to change the direction of the steering wheel in accordance with information input from the second controller 160 or information input from the driving operator 80.

[Process of Continuing to Follow Front Vehicle]

Figure 3:
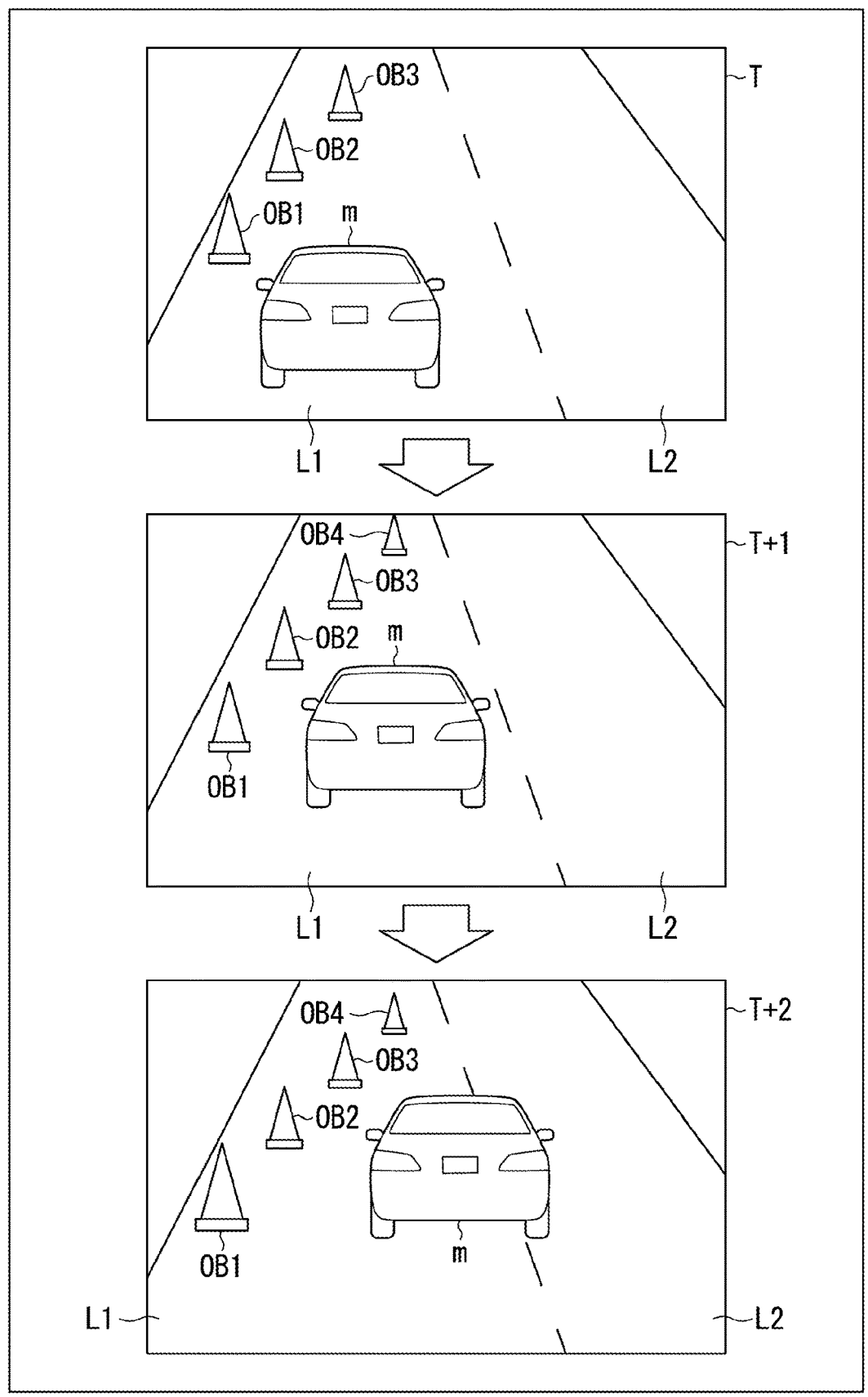
FIG. 3 is a diagram showing a process of continuing to follow a front vehicle.

FIG. 3 is a diagram showing a process of continuing to follow the front vehicle m. FIG. 3 shows images in which the traveling direction of the vehicle M is imaged by the vehicle M. In FIG. 3, the vehicle M is following the front vehicle m in a lane L1. A lane is regulated with regulation signs OB1 to OB4 in the traveling direction of the front vehicle m. Hereinafter, when the regulation signs OB1 to OB4 are not distinguished from each other, the regulation signs OB1 to OB4 are simply referred to as the "regulation signs OB" in some cases. The regulation signs OB are disposed temporarily or permanently on a road. For example, the temporarily disposed regulation signs OB are objects disposed on a road or near road when a predetermined situation such as road construction, accident handling, or rescue occurs on the road or near the road. At time T, the front vehicle m arrives in front of the regulation sign OB1 closest to the front vehicle m in the lane L1. At time T+1, the front vehicle m approaches the side of a lane L2 adjacent to the lane L1 to avoid the regulation sign OB1 and the regulation signs OB2 to OB4 disposed on the side of the regulation sign OB1 in the traveling direction. At time T+2, the front vehicle m enters the lane L2.

In this way, when the states of the regulation signs OB do not change before and after the front vehicle m has passed, the vehicle M continues the control to follow the front vehicle m. That is, the vehicle M recognizes the states of the regulation signs OB on the road from times T to T+2 or the states of the regulation signs OB and the state of the vehicle M and continues the following travel based on a recognition result.

[Process of Stopping Following Travel (Specific Process)]

The automated driving control device 100 stops the following travel based on a state of a specific target recognized by the recognizer 130 in a traveling region through which the front vehicle m has passed when the following travel of following the front vehicle is performed. Hereinafter, this process is referred to as a "specific process" in some cases.

Figure 4:
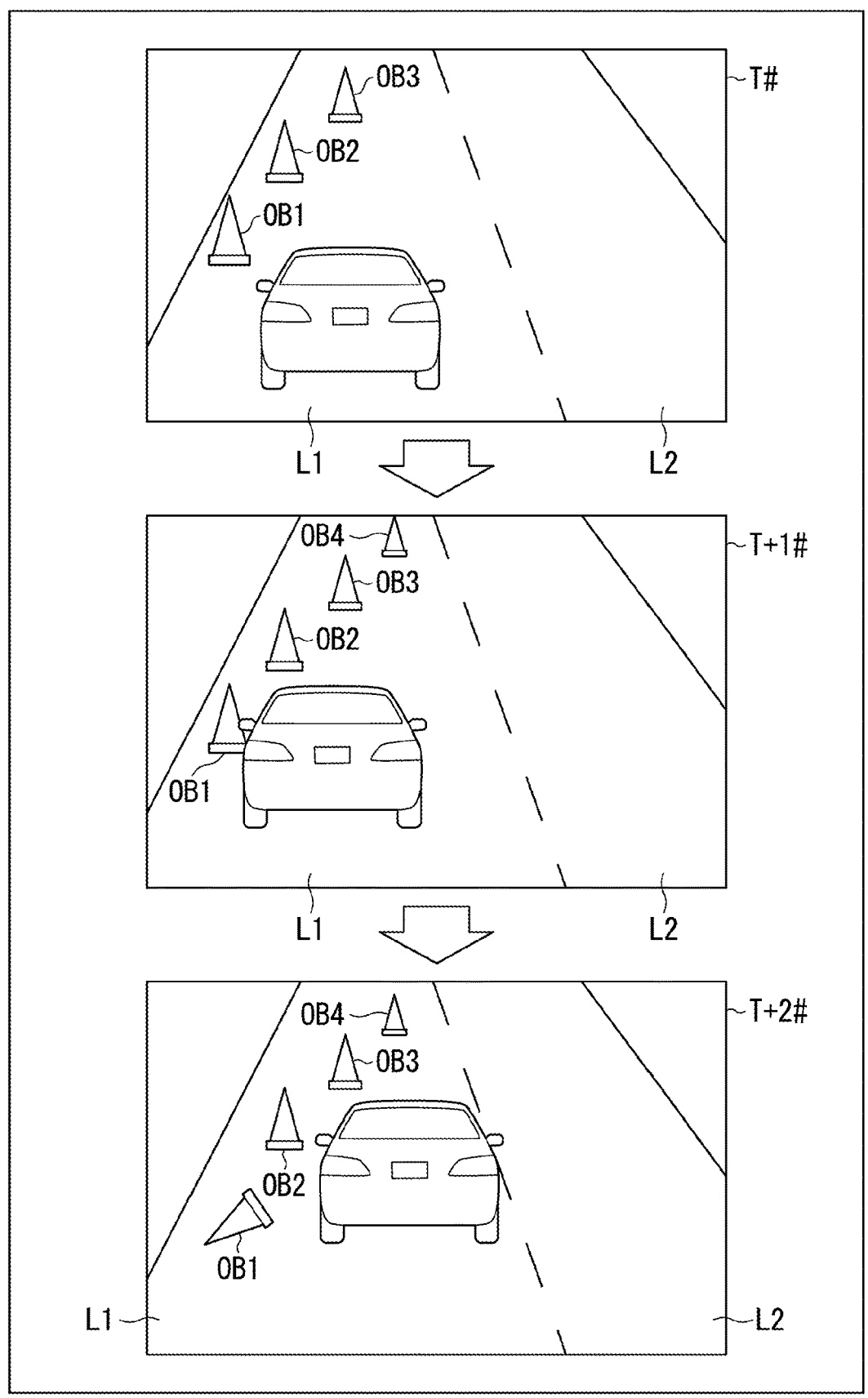
FIG. 4 is a diagram showing a specific process.

FIG. 4 is a diagram showing a specific process. Repeated description of FIG. 3 will be omitted. At time T #, the front vehicle m arrives in front of the regulation sign OB1 closest to the front vehicle m in the lane L1. At time T+1 #, the front vehicle m is traveling near the regulation sign OB1. At time T+2 #, the front vehicle m passes through a position at which the regulation sign OB1 is disposed at time T+1 #. At time T+2 #, the state of the regulation sign OB is a predetermined state different from the state at time T+1 #. In the example of FIG. 4, the predetermined state is a state in which the regulation sign OB used in a standing state has fallen over. The predetermined state may be a state in which the regulation signs are damaged or modified from a standard state.

In this way, when the front vehicle m is traveling near the regulation signs OB, the vehicle M stops the following travel based on the states of the regulation signs OB in the traveling region through which the front vehicle m has passed. That is, the vehicle M recognizes the states of the regulation signs OB on the road from times T # to T+2 # or the state of the vehicle M and the states of the regulation signs OB and stops the following travel based on a recognition result.

[Flowchart (Part 1)]

Figure 5:
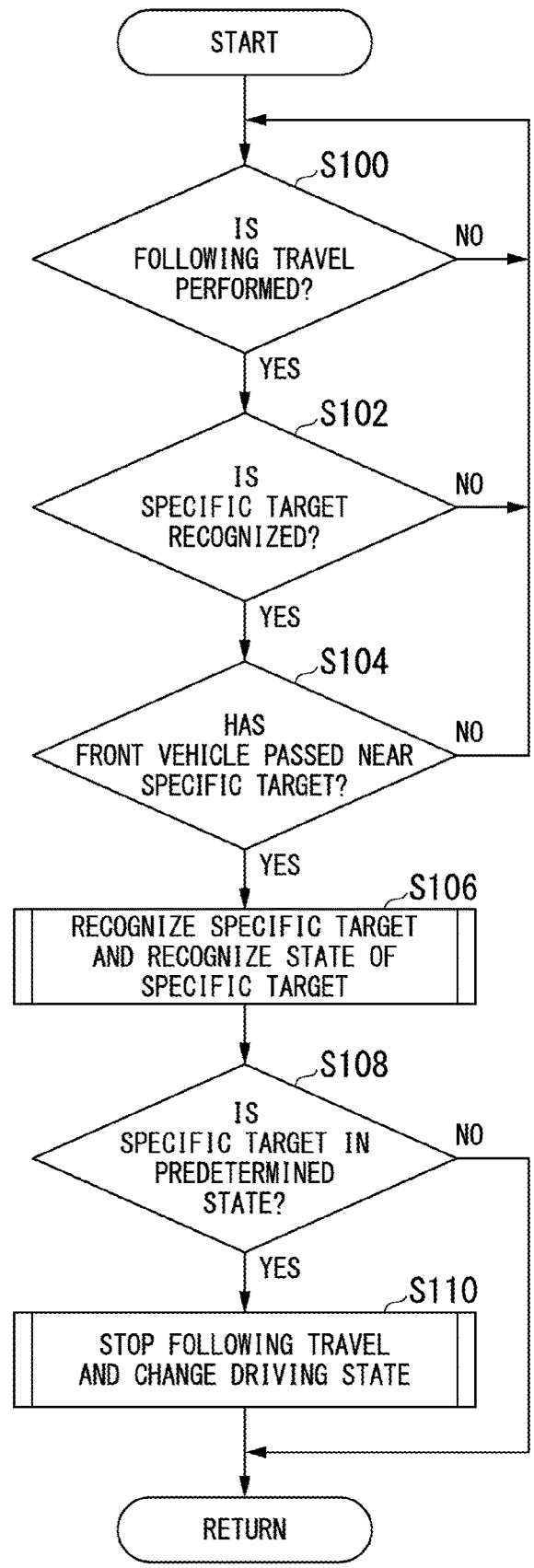
FIG. 5 is a flowchart showing a flow of the specific process performed by an automated driving control device.

FIG. 5 is a flowchart showing a flow of the specific process performed by the automated driving control device 100. First, the action plan generator 140 determines whether the following travel is performed (step S100). The following travel in this process is, for example, following travel performed irrespective of whether an occupant of the vehicle M grasps the steering wheel (or another operator such as a joystick) of the vehicle M or under the condition that the occupant does not grasp the steering wheel.

When the following travel is performed, the target recognizer 132 determines whether a specific target is recognized (step S102). When a specific target is not recognized, the process returns to step S100.

When a specific target is recognized, the recognizer 130 determines whether the front vehicle m has passed near a specific position at which the specific target is disposed in the longitudinal direction of the road (step S104). When the front vehicle m has not passed near the specific position at which the specific target is disposed in the longitudinal direction of the road, the process returns to step S100. In this process, when the recognizer 130 recognizes the specific target in a captured image, the recognizer 130 may track the specific target in the captured image in a subsequent process.

When the front vehicle m has passed near the specific position at which the specific target is disposed in the longitudinal direction of the road, the target recognizer 132 recognizes the specific target recognized in the captured image and recognizes a state of the recognized specific target (step S106). The captured image is an image captured after the front vehicle m has passed near the specific position. The details of this process and the process of step S110 to be described below will be described later.

Subsequently, the target recognizer 132 determines whether the recognized specific target is in a predetermined state (step S108). When the specific target is not in the predetermined state, the process of one routine of the flowchart ends.

When the specific target is in the predetermined state, the action plan generator 140 stops the following travel and changes a driving state (step S110). The details of this process will be described later. Then, the process of one routine of the flowchart ends.

Through the above-described processes, the automated driving control device 100 can realize the control of the vehicle in further accordance with the surrounding situation by stopping the following travel when the recognized specific target is in the predetermined state.

In the processes of the flowchart of FIG. 5 described above, the process of step S102 may be omitted. In this case, the automated driving control device 100 stops the following travel when the specific target in the predetermined state is recognized near the region through which the front vehicle m has passed. That is, when the specific target is not recognized in the state in which the vehicle M follows the front vehicle m, but the specific target in the predetermined state is recognized near a traveling trajectory (near the lane L1) along which the front vehicle m has passed, the following travel is stopped.

[Process (Part 1) of Recognizing State of Specific Target]

Figure 6:
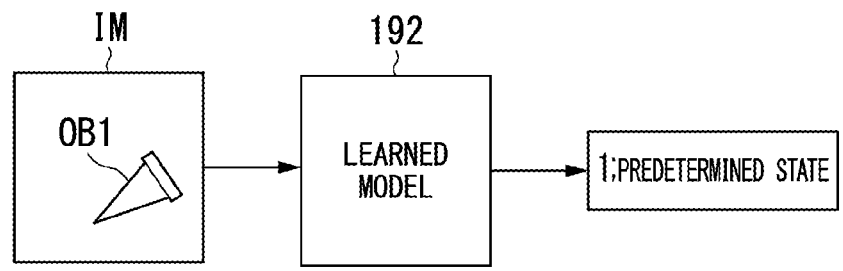
FIG. 6 is a diagram showing a process in which a target recognizer recognizes a state of a specific target using a learned model.

Here, a process of recognizing the state of the specific target in steps S106 and S108 will be described. FIG. 6 is a diagram showing a process in which the target recognizer 132 recognizes the state of the specific target using the learned model 192. When an image IM is input, the learned model 192 outputs information indicating whether or not the specific target included in the image is in the predetermined state.

The learned model 192 is a model which is generated when a learning device (not shown) learns learning data. The learned model 192 is a model learned through machine learning such as deep learning or a neural network. The learned model 192 has, for example, the form of a neural network. The learning data includes, for example, a first image obtained by imaging the specific target which is in the predetermined state, a plurality of pieces of first information associated with a first label indicating that the specific target of the first image is in the predetermined state, a second image obtained by imaging the specific target which is not in the predetermined state, and a plurality of pieces of second information associated with a second label indicating that the specific target of the second image is not in the predetermined state. The learning device performs learning so that a model (for example, a neural network) to which the first image is input outputs information indicating that the specific target is in the predetermined state and a model (for example, a neural network) to which the second image is input outputs information indicating that the specific target is not in the predetermined state, and generates the learned model 192.

The learned model 192 may be a model that outputs information indicating whether or not the specific target included in chronological images is in the predetermined state when the chronological images are input. In this case, the predetermined state includes a state in which the specific target is moving. In this case, the learning device learns learning data including chronological images and labels associated with the chronological images (labels indicating whether or not the specific target is in the predetermined state) and generates the learned model 192.

The target recognizer 132 may determine that the recognized specific target is in the predetermined state when a distribution of a feature amount of a specific target in the predetermined state stored in the storage 190 matches a distribution of the recognized specific target.

In this way, the automated driving control device 100 can more precisely determine whether the specific target is in the predetermined state. For example, even when the automated driving control device 100 cannot recognize whether the front vehicle m comes into contact with the specific target and the specific target is in the predetermined state, the automated driving control device 100 can more precisely determine whether the specific target is in the predetermined state based on the state of the specific target recognized by the target recognizer 132 in the traveling region through which the front vehicle m has passed.

[Process (Part 2) of Recognizing State of Specific Target]

The automated driving control device 100 stops the following travel when the state of the specific target recognized by the recognizer 130 in the traveling region through which the front vehicle m has passed is different from the state of the specific target recognized by the recognizer 130 immediately before (or a predetermined time before) the front vehicle m passes. That is, the automated driving control device 100 stops the following travel when the state of the specific target recognized by the recognizer 130 in the traveling region through which the front vehicle m has passed is a state in which the specific target stops at a position different from a position at which the specific target has been located.

Figure 7:
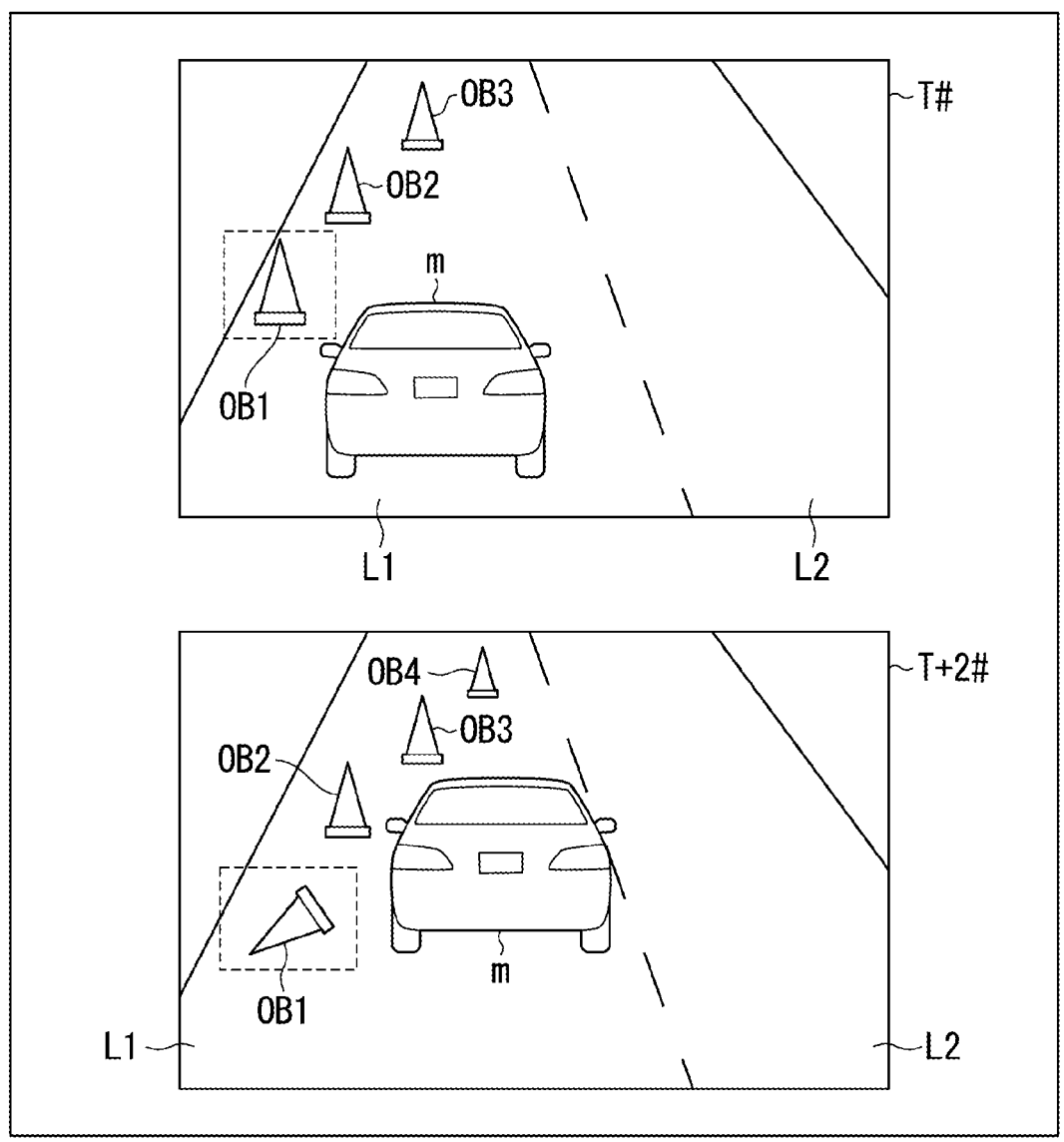
FIG. 7 is a diagram showing a process in which the target recognizer recognizes a state of the specific target.

FIG. 7 is a diagram showing a process in which the target recognizer 132 recognizes a state of the specific target. The target recognizer 132 recognizes the same specific target as the specific target recognized in a first specific image captured at time T # in a second specific image captured at time T+2 #. For example, the target recognizer 132 estimates a target that has a distribution of the same feature amount as that of the regulation sign OB1 located in front of the regulation sign OB2 and recognized in the first specific image to be the regulation sign OB1 in the second specific image. Then, the target recognizer 132 determines that the regulation sign OB1 in the second specific image is in the predetermined state when the position or direction of the regulation sign OB1 in the first specific image is different from the position or direction of the regulation sign OB1 in the second specific image. Time T # may be a time at which the specific target is first recognized by the target recognizer 132 or may be, for example, a time immediately before the specific target can be recognized by the front vehicle m.

For example, the target recognizer 132 determines that the regulation sign OB1 in the second image is in the predetermined state when a shape of a distribution of the feature amount of the horizontal regulation sign OB1 is adjusted in the direction of a shape of a distribution of the feature amount of the standing regulation sign OB1 and the shapes of the distributions match each other.

Figure 8:
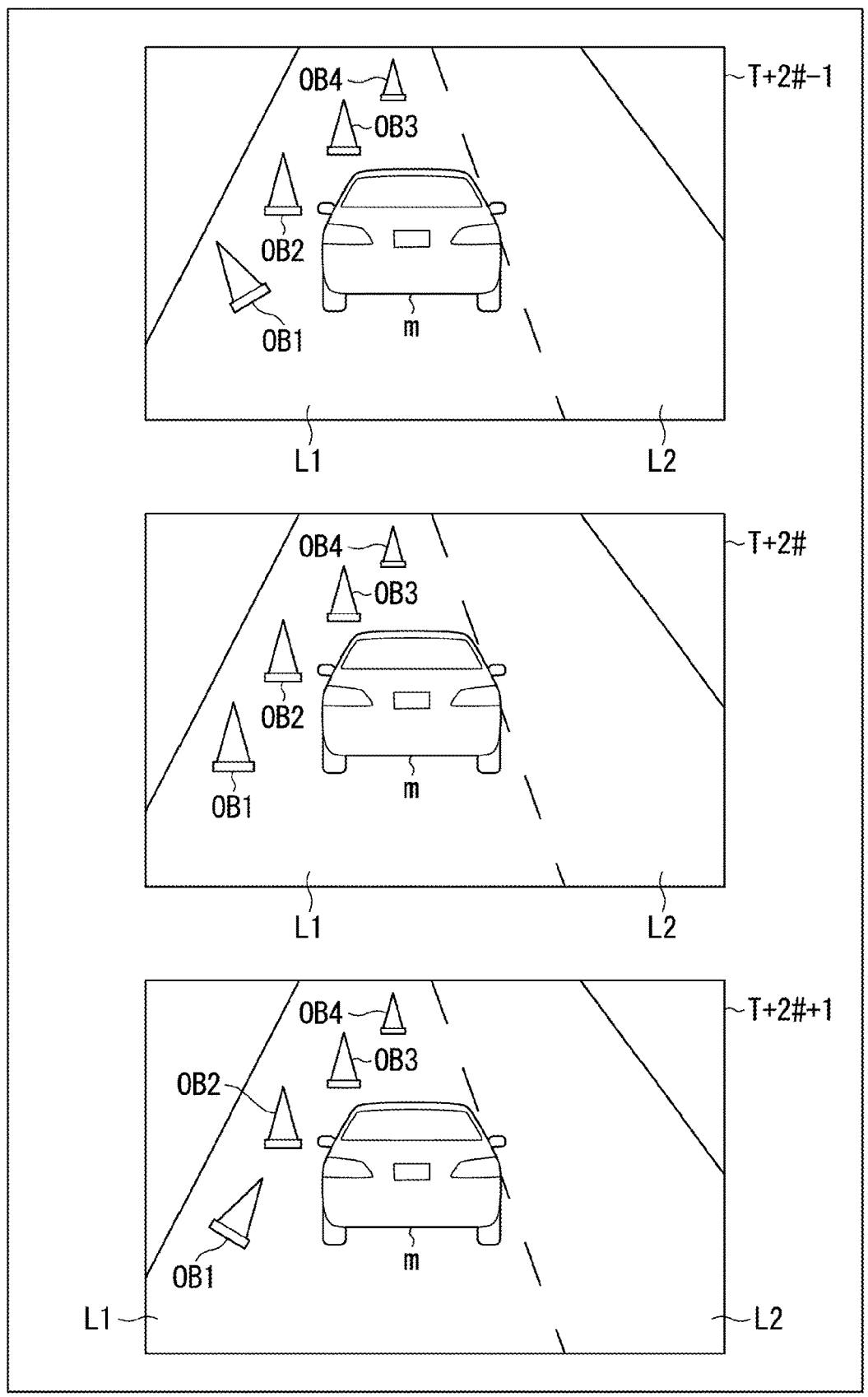
FIG. 8 is a diagram showing a state in which a specific target is moving.

The target recognizer 132 may determine that the specific target is in the predetermined state when the specific target is moving. FIG. 8 is a diagram showing a state in which a specific target is moving. For example, based on images before and after time T+2 # (times T+2 #−1 and T+2 #+1), the target recognizer 132 determines whether the specific target is moving. For example, the target recognizer 132 determines that the regulation sign OB1 is moving, as shown in FIG. 8, when a standard state of the regulation sign OB1 is set to a state of time T+2 # and the specific target in the images before and after that time are recognized to be in first and second states or when the standard state, the first state, and the second state are repeated. The first state is a state in which the regulation sign OB1 is inclined to a support point in a first direction with respect to the standard state a first end of a base of the regulation signal OB1 as a support point (in which the regulation sign OB1 is inclined to a first direction with respect to the standard state. A support point of the first state is a first end of a base of the regulation signal OB1). The second state is a state in which the regulation sign OB1 is inclined to the support point in a second direction opposite the first direction with respect to the standard state with a second end of the regulation sign OB1 facing the first end as a support point (in which the regulation sign OB1 is inclined to a second direction opposite the first direction with respect to the standard state. A support point of the second state is a second end of the regulation sign OB1 facing the first end).

[Others]

Instead of (or in addition to) the foregoing process, the target recognizer 132 may determine that the specific target is in the predetermined state when the position of the specific target is shifted or the specific target which has been in the standard state is in a state different from the standard state. Further, instead of (or in addition to) the foregoing process, the target recognizer 132 may determine that the specific target is in the predetermined state when the front vehicle m has passed by the side of the specific target and the specific target has moved for a predetermined time and stopped while located on the road. Alternatively, the target recognizer 132 may determine that the specific target is in the predetermined state when the front vehicle m has passed by the side of the specific target and the specific target that was present before the passing has then disappeared.

In this way, the automated driving control device 100 can more precisely determine whether the specific target is in the predetermined state. For example, the automated driving control device 100 can more precisely determine whether the specific target is in the predetermined state based on the state of the target recognized by the target recognizer 132 in the traveling region through which the front vehicle m has passed even when the automated driving control device 100 cannot recognize whether the front vehicle m comes into contact with the specific target and causes the specific target to be in the predetermined state.

[Flowchart (Part 2)]

Figure 9:
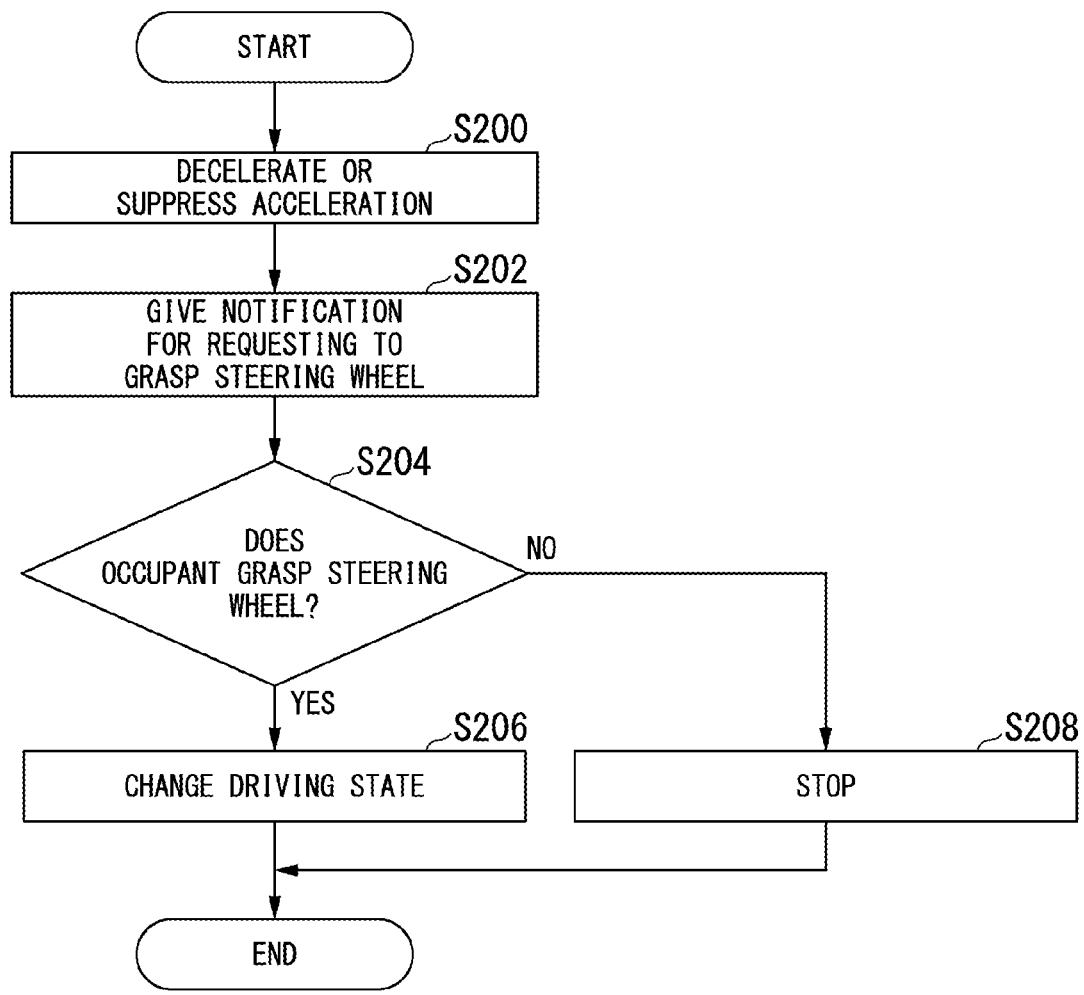
FIG. 9 is a flowchart showing a flow of a process performed when following travel performed by the automated driving control device is stopped.

FIG. 9 is a flowchart showing a flow of a process performed when following travel performed by the automated driving control device 100 is stopped. The process of the flowchart is a process performed when it is determined in the process of step S110 of the flowchart of FIG. 5 that the following travel stops.

First, the action plan generator 140 decelerates the vehicle M or suppresses acceleration of the vehicle M (step S200). Subsequently, the output controller 180 causes the HMI 30 to output a notification for requesting an occupant to grasp the steering wheel (step S202). When the occupant is already grasping the steering wheel, the process of step S202 may be omitted.

Subsequently, the occupant monitor 170 determines whether the occupant grasps the steering wheel within a predetermined period (step S204). When the occupant grasps the steering wheel within the predetermined period, the action plan generator 140 changes the driving state to a driving state performed under the condition that the steering wheel is grasped (step S206). That is, the action plan generator 140 changes the driving state to a driving state of the third traveling control. When the occupant does not grasp the steering wheel within the predetermined period, the action plan generator 140 causes the vehicle M to stop or to slow down and then stop (step S208). A position at which the vehicle M stops is, for example, a position in front of the specific target in the predetermined state or a position such as a shoulder at which the vehicle can safely stop.

In step S204 described above, instead of (or in addition to) determining whether the steering wheel is being grasped, it may be determined whether another condition is satisfied. The other condition is any condition such as the condition that the occupant monitors the surroundings of the vehicle M or the condition that the occupant operates a brake pedal.

Instead of the process of the flowchart of FIG. 9 described above, when the following travel stops, an auto-lane change may be performed. Thus, the vehicle M changes its lane to the lane L2 automatedly. When no vehicle which is an obstacle at the time of the lane change is located in the lane L2, the lane is changed. When another vehicle which is an obstacle at the time of change in the lane is located in the lane L2, the process of the flowchart of FIG. 9 may be performed.

When it is determined that the specific target is in the predetermined state and the auto-lane change is then performed or the lane is changed to the lane L2, the vehicle M may restrict a return to the lane L1 in which the specific target in the predetermined state is located during the predetermined period.

In this way, the automated driving control device 100 can realize control of the vehicle M in further accordance with the surrounding situation by performing the control in which the following travel is stopped and transitions to a predetermined driving state.

According to the above-described first embodiment, the automated driving control device 100 can realize control of the vehicle in further accordance with the surrounding situation by stopping the following travel based on the state of the target recognized by the recognizer 130 in the traveling region through which the front vehicle m has passed when the following travel of following the front vehicle m is performed.

Modification Example (1) of First Embodiment

Hereinafter, a modification example of the first embodiment will be described. In the first embodiment, the specific target is set to the regulation sign OB1. In the modification example of the first embodiment, the specific target is a guiding sign OB11. Hereinafter, differences from the first embodiment will be described.

[Process of Continuously Following Front Vehicle]

Figure 10:
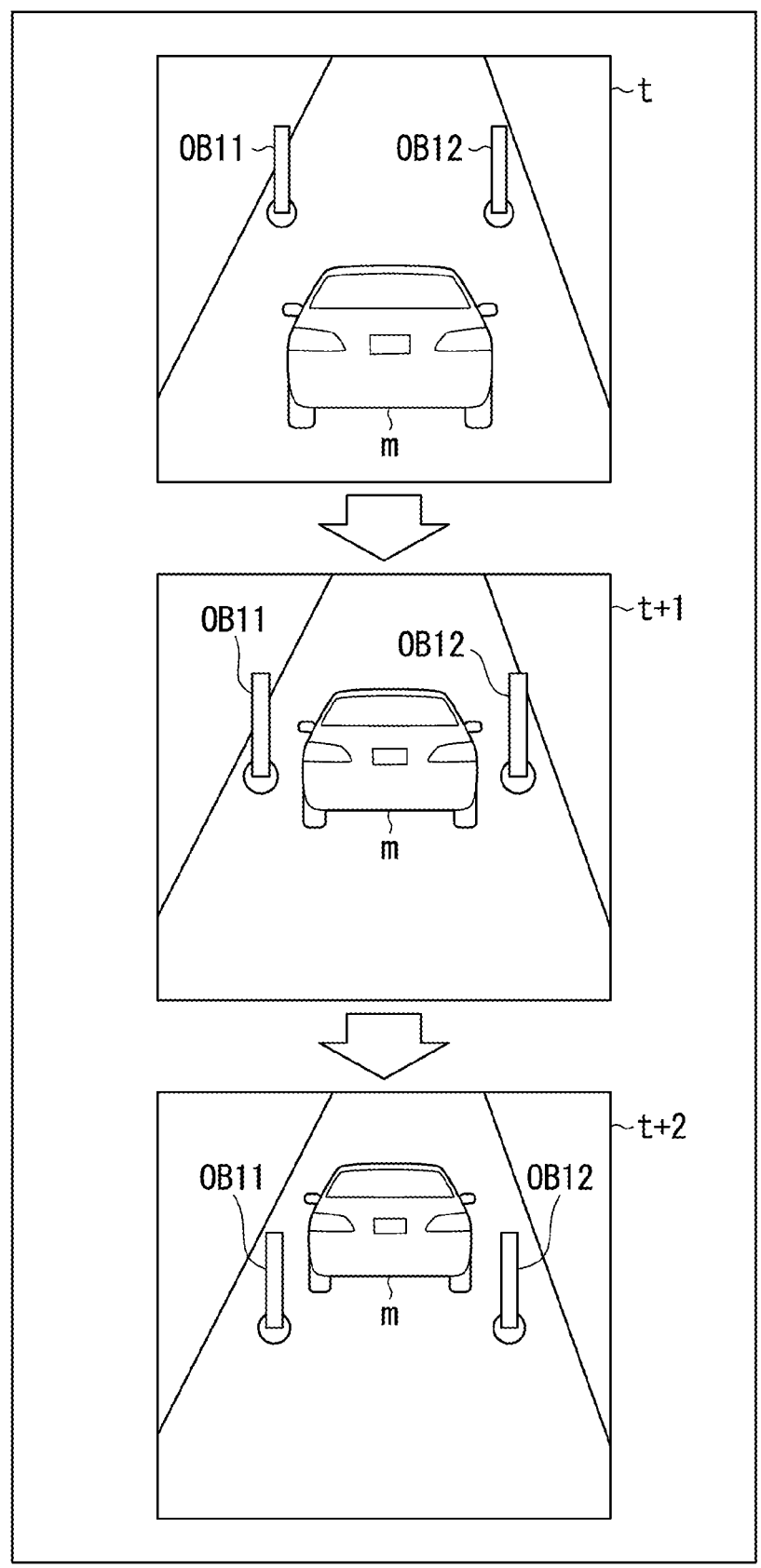
FIG. 10 is a diagram showing a process of continuing to follow a front vehicle in a modification example of the first embodiment.

FIG. 10 is a diagram showing a process of continuing to follow the front vehicle m in a modification example of the first embodiment. FIG. 10 shows images in which the traveling direction of the vehicle M is imaged by the vehicle M.

In FIG. 10, the vehicle M is following the front vehicle m on a road. Guiding signs OB11 and OB12 are provided in the traveling direction of the front vehicle m. Hereinafter, when the guiding signs OB11 and OB12 are not distinguished from each other, the guiding signs OB11 and OB12 are simply referred to as the "guiding signs OB" in some cases The guiding signs OB are formed of, for example, elastic members, poles are connected to bases, and the bases are fixed to the road.

At time t, the front vehicle m arrives in front of the guiding signs OB11 and OB12. At time t+1, the front vehicle m is located between the guiding signs OB11 and OB12. At time t+2, the front vehicle m passes between the guiding signs OB11 and OB12 to be located behind the guiding signs OB.

In this way, when a predetermined change does not occur in the state of the guiding signs OB before and after the front vehicle m has passed the guiding signs OB, the vehicle M continues control of following the front vehicle m. That is, the vehicle M recognizes the states of the guiding signs OB or the states of the guiding signs OB and the state of the vehicle M on the road from time t to time t+2 and continues the following travel based on a recognition result.

[Process of Stopping Following Travel (Specific Process)]

Figure 11:
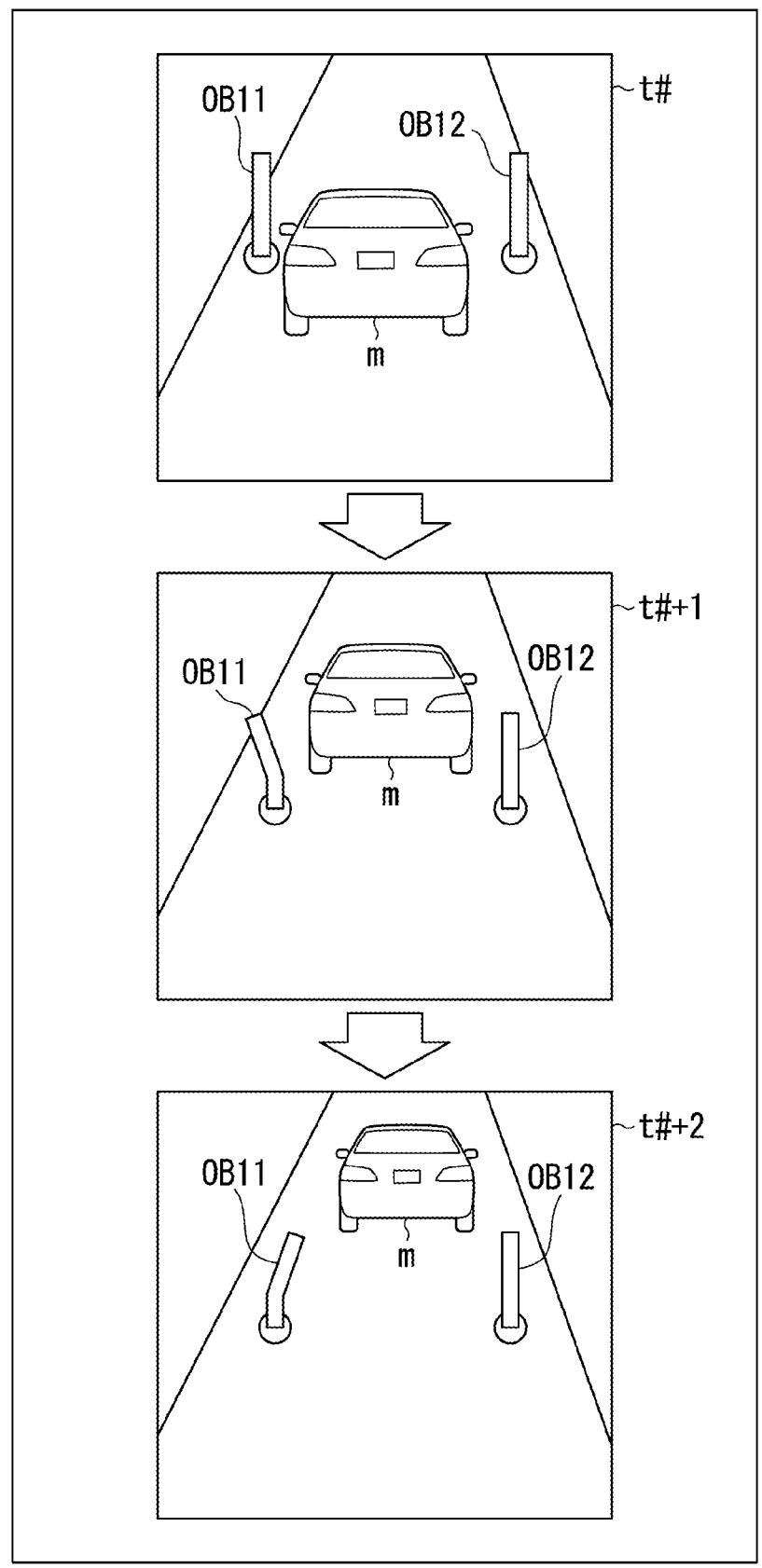
FIG. 11 is a diagram showing a specific process.

FIG. 11 is a diagram showing a specific process. Repeated description of FIG. 10 will be omitted. At time t #, the front vehicle m is located between the guiding signs OB11 and OB12. At time t #+1, the front vehicle m passes between the guiding signs OB11 and OB12 to be located behind the guiding signs OB. At time t #+2, the front vehicle m is located farther behind the position of time t #+1.

At times t #+1 and t #+2, since the guiding sign OB11 is bent, the target recognizer 132 determines that the guiding sign OB11 is in the predetermined state. Then, the action plan generator 140 stops the following travel.

In this way, when the front vehicle m is traveling near the guiding sign OB11, the vehicle M stops the following travel based on the states of the guiding signs OB in the traveling region through which the front vehicle m has passed. That is, the vehicle M recognizes the states of the guiding signs OB or the states of the guiding signs OB and the state of the vehicle M on the road from time t # to time t #+2 and stops the following travel based on a recognition result.

According to the above-described modification example (1) of the first embodiment, the automated driving control device 100 can obtain the same advantages as those of the first embodiment.

Modification Example (2) of First Embodiment

Hereinafter, a modification example of the first embodiment will be described. In the modification example of the first embodiment, it is determined whether a split specific target is in the predetermined state. Hereinafter, differences from the first embodiment will be described.

Figure 12:
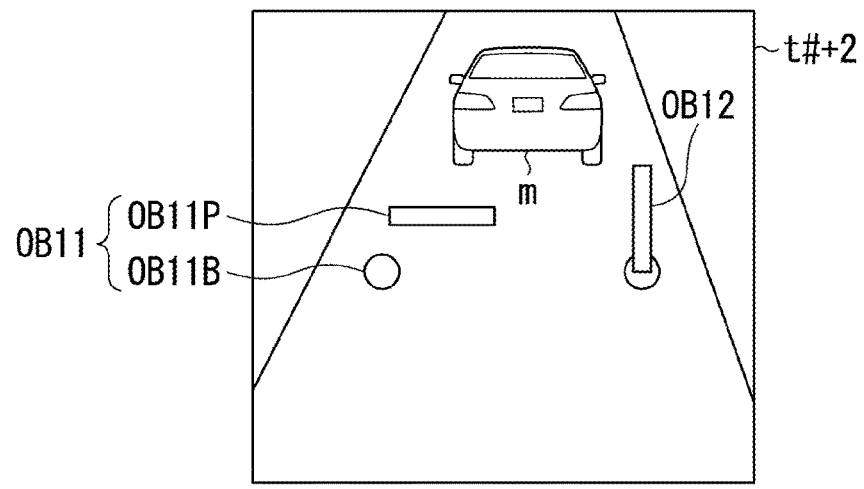
FIG. 12 is a diagram showing a process of recognizing whether a specific target split by the target recognizer is in a predetermined state.

FIG. 12 is a diagram showing a process of recognizing whether a specific target split by the target recognizer 132 is in a predetermined state. At time t #+2, the front vehicle m passes between the guiding signs OB11 and OB12 to be located behind the guiding signs OB. At time t #+2, the target recognizer 132 determines that the guiding sign OB11 is in the predetermined state when a pole OB11P of the guiding sign OB11 is split from a base OB11B and lies on a road. Then, the action plan generator 140 stops the following travel.

The target recognizer 132 determines whether the state of the specific target in the traveling region through which the front vehicle m has passed is a split specific target when the following travel of following the front vehicle m is performed. As shown in FIG. 12, when the specific target OB11 is split into the pole OB11P and the base OB11B of the specific target and the pole OB11P has fallen on the road, the target recognizer 132 recognizes that the pole OB11P or the base OB11B is a specific target which is in the predetermined state.

In this way, the target recognizer 132 determines that the specific target is in the predetermined state when a part of the specific target after the front vehicle m passes is located at a position different from the position before the front vehicle m passes or is in a state different from the state before the front vehicle m passes. As described above, this process may be performed using the learned model 192 or a distribution of a feature amount of the specific target (for example, the base OB11B or the pole OB11P) which is in the predetermined state. The action plan generator 140 stops the following travel when the target recognizer 132 determines that the specific target is split.

According to the above-described modification example (2) of the first embodiment, the automated driving control device 100 can obtain the same advantages as those of the first embodiment.

Second Embodiment

Hereinafter, a second embodiment will be described. In the second embodiment, when the size of a specific target is equal to or less than a predetermined size, the following travel is not stopped. Hereinafter, differences from the first embodiment will be described.

Figure 13:
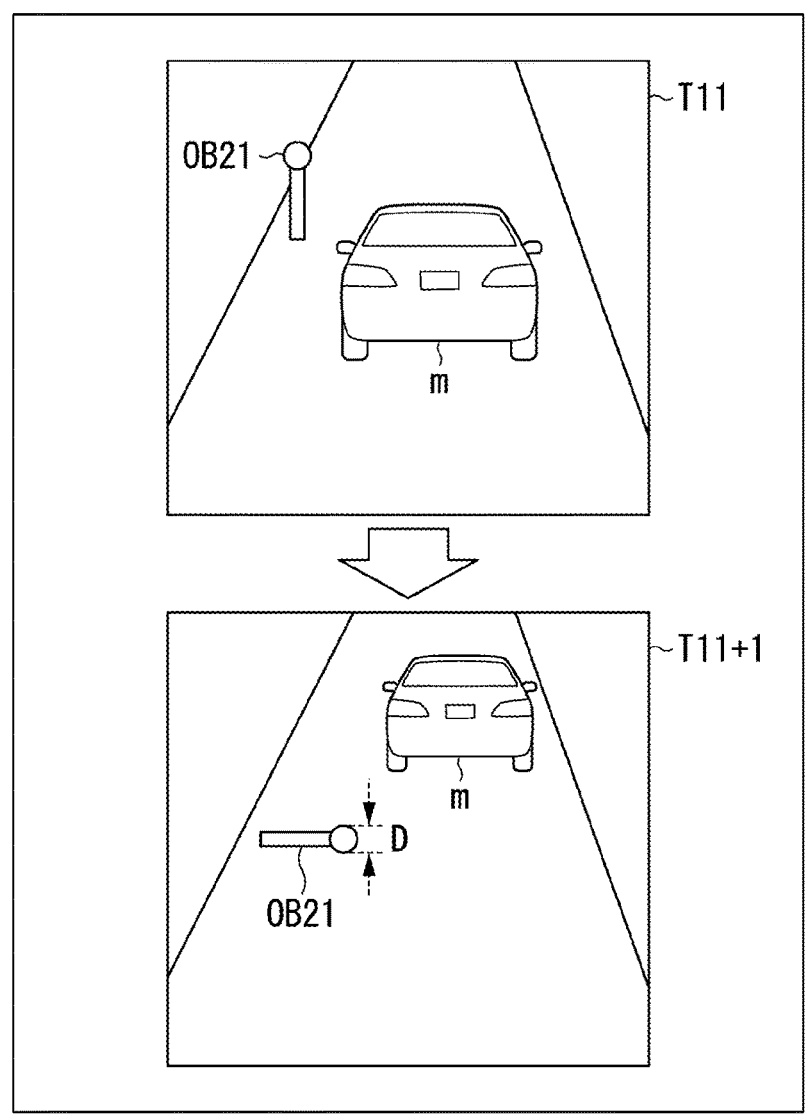
FIG. 13 is a diagram showing a process performed when a specific target with a size equal to or less than a predetermined size is in a specific state.

FIG. 13 is a diagram showing a process performed when a specific target with a size equal to or less than the predetermined size is in a specific state. At time T11, the front vehicle m arrives in front of a guiding sign OB21. At time T11+1, the front vehicle m passes by the guiding sign OB21 to be located behind the guiding sign OB. At time T11+1, since the guiding sign OB21 has fallen over (in a state different from that at normal times), the target recognizer 132 determines that the guiding sign OB21 is in the predetermined state. Here, the target recognizer 132 determines whether the size of the guiding sign OB21 which is in the predetermined state is equal to or less than a predetermined size. When the size of the guiding sign OB21 is greater than the predetermined size, the action plan generator 140 stops the following travel.

When the size of the guiding sign OB21 is equal to or less than the predetermined size, the action plan generator 140 continues the following travel without stopping the following travel. The predetermined size is a size that is based on a distance between the road and the lower portion of the body of the vehicle M stored in a storage device of the vehicle M (a minimum ground clearance). For example, when the distance between the road and the lower portion of the body of the vehicle M is a first distance, the predetermined size is a size in which the size (height) of the target in a vertical opposite direction on the road corresponds to the first distance or a distance obtained by subtracting a margin from the first distance. For example, as shown in FIG. 13, the vehicle M continues the following travel when a height D of the object in the vertical opposite direction on the road is equal to or less than the first distance or a distance obtained by subtracting the margin from the first distance.

According to the above-described second embodiment, the automated driving control device 100 can realize the control of the vehicle in further accordance with the surrounding situation based on the size of the specific target.

Third Embodiment

Hereinafter, a third embodiment will be described. In the third embodiment, the automated driving control device 100 selectively performs first horizontal position control or second horizontal position control and determines whether to stop the following travel based on the performed horizontal position control. Hereinafter, differences from the first embodiment will be described.

The first horizontal position control is control in which a position of the vehicle M in the horizontal direction is controlled based on the road mark line. For example, when the first horizontal position control is performed, the automated driving control device 100 recognizes right and left road mark lines and controls the vehicle M such that the vehicle M is located in the middle of the recognized road mark lines. The automated driving control device 100 may recognize one of the right and left road mark lines and control the vehicle M such that the middle of the vehicle M in the width direction is located at a position to which the horizontal position of the vehicle M is slid from the one road mark line by a predetermined distance.

The second horizontal position control is control in which a position of the vehicle M in the horizontal direction is controlled based on the front vehicle m. For example, when the second horizontal position control is performed, the automated driving control device 100 controls the vehicle M such that the vehicle M travels along a traveling trajectory along which the front vehicle m has traveled (a standard position such as a center of the traveling trajectory in the vehicle width direction of the front vehicle m).

The first horizontal position control and the second horizontal position control may be performed when the following travel is performed. For example, when the first horizontal position control is performed, a position of the vehicle M in the traveling direction is controlled based on the position of the front vehicle m in the longitudinal direction of the road so that a distance between the vehicle M and the front vehicle m is a predetermined distance and a position of the vehicle M in the width direction is controlled based on the road mark line. For example, when the second horizontal position control is performed, a position of the vehicle M in the traveling direction is controlled based on the position of the front vehicle m in the longitudinal direction of the road so that the distance between the vehicle M and the front vehicle m is the predetermined distance and the position of the vehicle M in the width direction is controlled based on the traveling trajectory of the front vehicle m. The first horizontal position control and the second horizontal position control may be performed in combination.

An inter-vehicle distance between the vehicle M and the front vehicle m maintained by the vehicle M in the second horizontal position control is set to be longer than an inter-vehicle distance between the vehicle M and the front vehicle m maintained by the vehicle M in the first horizontal position control. Recognition precision of the road mark line is improved by setting the inter-vehicle distance in the second horizontal position control to be longer than the inter-vehicle distance in the first horizontal position control. The vehicle M can detect objects near the front vehicle m with higher precision.

Figure 14:
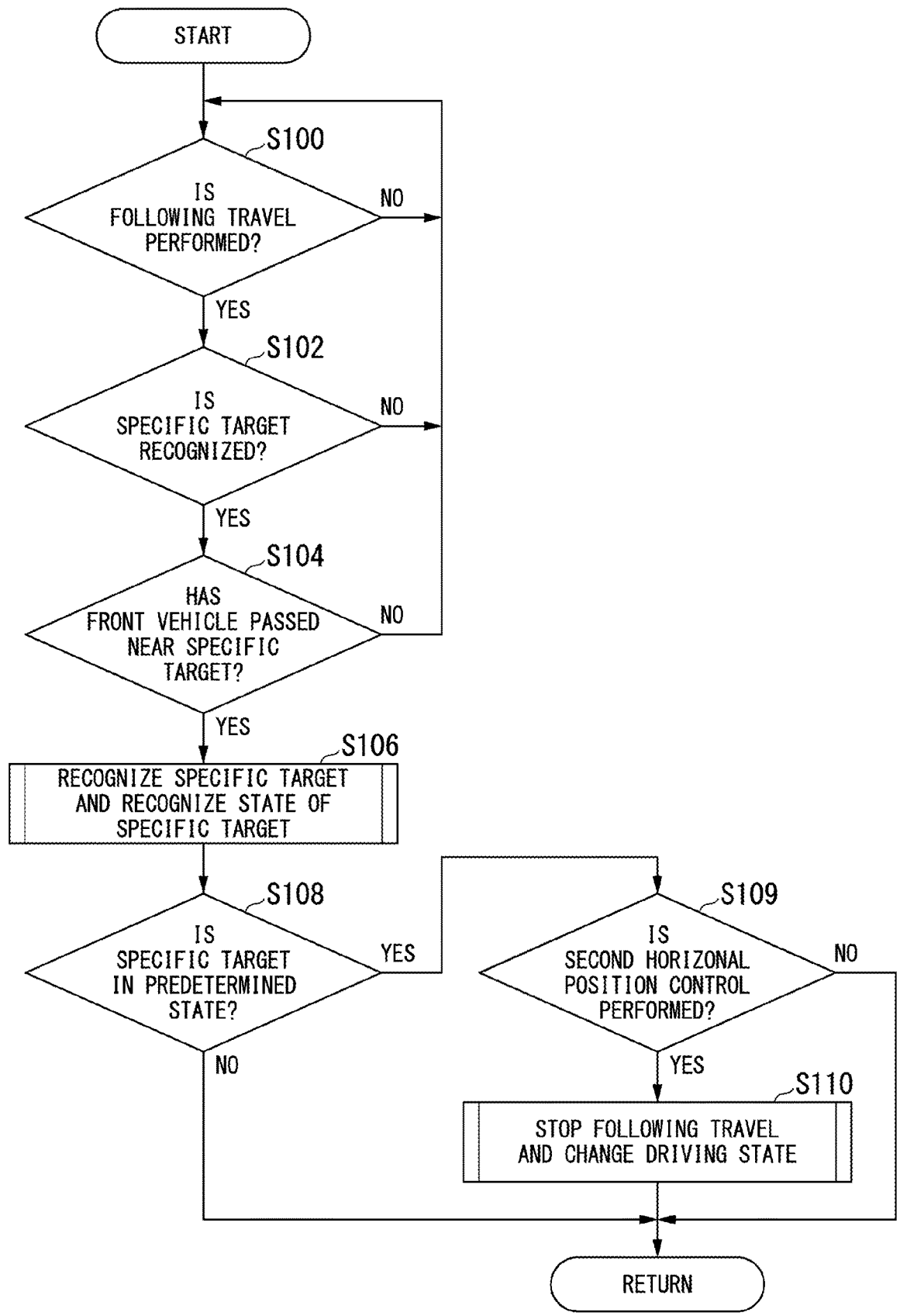
FIG. 14 is a flowchart showing an example of a flow of a process performed by an automated driving control device according to a third embodiment.

FIG. 14 is a flowchart showing an example of a flow of a process performed by the automated driving control device 100 according to the third embodiment. As shown in the flowchart of FIG. 14, the action plan generator 140 does not stop the following travel based on a state of a specific target (or a target) recognized by the recognizer 130 in the traveling region through which the front vehicle m has passed when the first horizontal position control is performed. The action plan generator 140 stops the following travel based on the state of the specific target (or the target) recognized by the recognizer 130 in the traveling region through which the front vehicle m has passed when the second horizontal position control is performed.

Description of processes similar to the processes of the flowchart of FIG. 5 described above will be omitted. A process of step S109 which is not performed in the flowchart of FIG. 5 will be described. In the process of step S109, when the specific target is determined to be in the predetermined state, the action plan generator 140 determines whether the second horizontal position control is performed (step S109). When the second horizontal position control is not performed, the processes of the flowchart end. When the second horizontal position control is performed, the action plan generator 140 stops the following travel and changes the driving state (step S110). Then, the processes of the flowchart end.

Instead of the processes of the flowchart of FIG. 14 described above, the automated driving control device 100 may perform the processes of the flowchart of FIG. 5 when the second horizontal position control is performed.

In this way, when the specific target is in the predetermined state and the second horizontal position control is performed, the action plan generator 140 stops the following travel. Thus, the horizontal position control is inhibited based on the front vehicle m which is not suitable as a standard. This is because there is a high possibility of the front vehicle m having caused the specific target to enter the predetermined state when the specific target which is in a normal state before the passing of the front vehicle m enters the predetermined state after the front vehicle m passes.

According to the above-described third embodiment, when the following travel of following the front vehicle m recognized by the recognizer 130 is performed, the automated driving control device 100 can realize the control of the vehicle in further accordance with the surrounding situation by stopping the following travel based on the state of the target recognized by the recognizer 130 in the traveling region through which the front vehicle m has passed.

[Hardware Configuration]

Figure 15:
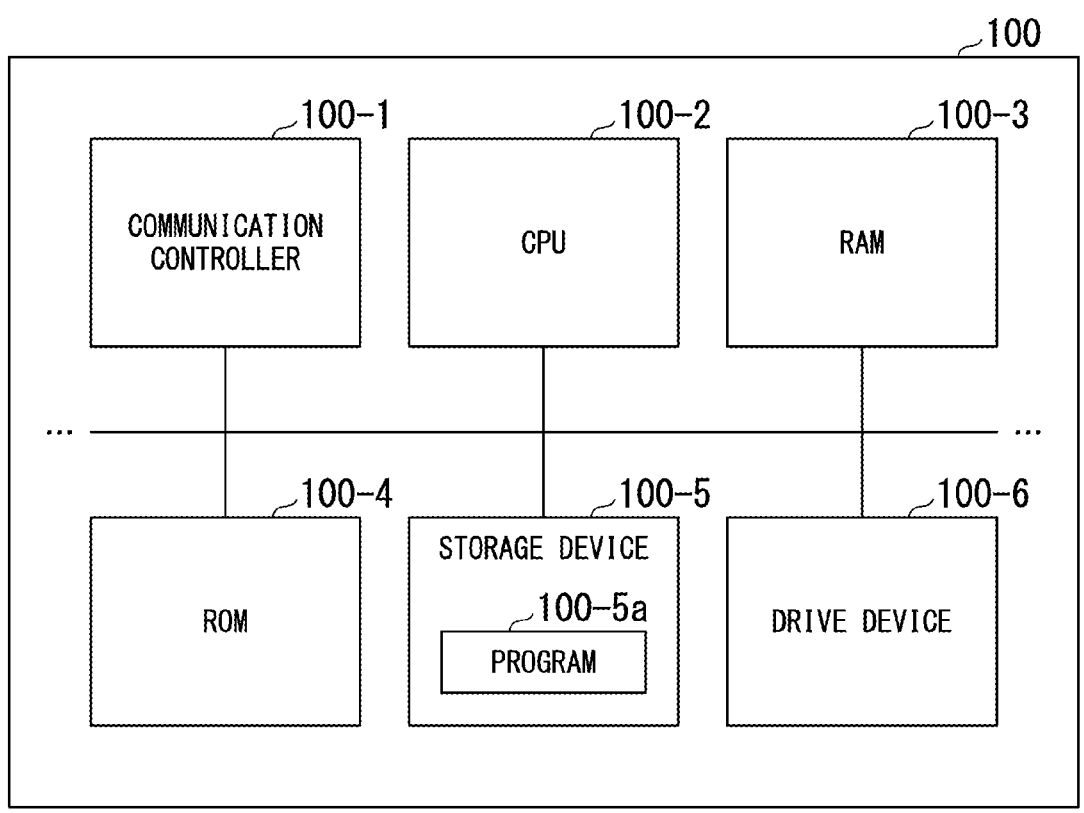
FIG. 15 is a diagram showing an example of a hardware configuration of the automated driving control device.

FIG. 15 is a diagram showing an example of a hardware configuration of the automated driving control device 100. As shown, the automated driving control device 100 is configured such that a communication controller 100-1, a CPU 100-2, a random access memory (RAM) 100-3 that is used as a working memory, a read-only memory (ROM) 100-4 that stores a boot program or the like, a storage device 100-5 such as a flash memory or a hard disk drive (HDD), a drive device 100-6, and the like are connected to each other via an internal bus or a dedicated communication line. The communication controller 100-1 performs communication with constituent elements other than the automated driving control device 100. The storage device 100-5 stores a program 100-5a that is executed by the CPU 100-2. The program is loaded on the RAM 100-3 by a direct memory access (DMA) controller (not shown) or the like to be executed by the CPU 100-2. Thus, some or all of the recognizer 130, the action plan generator 140, and the second controller 160 are realized.

The above-described embodiment can be expressed as follows:

a vehicle control device including a storage device that stores a program and a hardware processor, the hardware processor executing the program stored in the storage device to perform:

recognizing a surrounding situation of a vehicle;

controlling a speed and steering of the vehicle according to a recognition result; and stopping following travel of following a recognized front vehicle according to a recognized state of a target in a traveling region through which the front vehicle has passed when the following travel is performed, wherein the target is a regulation sign for regulating a part of a lane in which a vehicle is traveling, a regulation sign for regulating a lane, or a guiding sign for guiding a visual line of an occupant of the vehicle.

The embodiments for carrying out the present invention have been described above, but the present invention is not limited to the embodiments. Various modifications and substitutions can be made within the scope of the present invention without departing from the gist of the present invention.

What is claimed is:

1. A vehicle control device comprising:
a processor; and
a memory storing executable instructions that, when executed by the processor, facilitates performance of operations, comprising:
recognizing a surrounding situation of a vehicle including a front vehicle traveling in front of the vehicle and an object presenting near the front vehicle,
controlling a speed and steering of the vehicle according to a result of the recognizing,
causing the vehicle to follow the front vehicle, and
causing the vehicle to stop following the front vehicle in response to determining that the front vehicle travels near the object at a first time and the object is in a first state at the first time, and a state of the object had changed from the first state to a second state different from the first state after the front vehicle passes through the object at a second time after the first time in a case in which the vehicle is following the front vehicle, and
wherein the object is a regulation sign for regulating a part of a lane in which a vehicle is traveling, a regulation sign for regulating a lane, or a guiding sign for guiding a visual line of an occupant of the vehicle.

2. The vehicle control device according to claim 1, wherein
the recognizing comprises determining whether a captured image is in a predetermined state by inputting the captured image to a learned model,
the operations further comprise causing the vehicle to stop following the front vehicle in response to determining that the captured image is in the predetermined state, and
the learned model is a model learned so that information indicating that the captured image is in the predetermined state is output when the captured image including the object in the predetermined state is input.

3. The vehicle control device according to claim 1, wherein the operations further comprises causing the vehicle to stop following the front vehicle in response to determining that the state of the object in a traveling region through which the front vehicle has passed is different from the state of the object immediately before the front vehicle passes.

4. The vehicle control device according to claim 1, wherein the state of the object in a traveling region through which the front vehicle has passed is a state in which the object is moving or a state in which the object stops at a different position from a position at which the object was located.

5. The vehicle control device according to claim 1, wherein the object is an object that is temporarily disposed on a road and is not stored in map information referred to by the vehicle.

6. The vehicle control device according to claim 1, wherein the operations further comprise:
performing first control in which a position of the vehicle in a horizontal direction is controlled according to a road mark line along which the vehicle is traveling and second control in which the position of the vehicle in the horizontal direction is controlled according to the front vehicle,
continuing to cause the vehicle to follow the front vehicle according to the state of the object in a traveling region through which the front vehicle has passed during the performing of the first control, and
causing the vehicle to stop following the front vehicle according to the state of the object in the traveling region through which the front vehicle has passed during the performing of the second control.

7. The vehicle control device according to claim 6, wherein an inter-vehicle distance between the vehicle and the front vehicle maintained by the vehicle in the second control is longer than an inter-vehicle distance between the vehicle and the front vehicle maintained by the vehicle in the first control.

8. The vehicle control device according to claim 1, wherein the operations further comprise performing a travel control in which grasping of an operator of the vehicle by an occupant of the vehicle is a condition in which following of the front vehicle irrespective of whether the occupant of the vehicle grasps the operator of the vehicle is performed and the following of the front vehicle is stopped according to the state of the object in a traveling region through which the front vehicle has passed.

9. The vehicle control device according to claim 1, wherein the operations further comprise continuing to cause the vehicle to follow the front vehicle in response to determining that a size of the object is equal to or less than a predetermined size.

10. The vehicle control device according to claim 9, wherein the predetermined size or is based on a distance between a road and a lower portion of a body of the vehicle.

11. The vehicle control device according to claim 1, wherein the object is an object that has a region of which light reflection intensity is equal to or greater than a threshold, an object that has a region of which light reflection intensity is higher by a predetermined degree or more than another region of the object, or an object that has a reflector.

12. The vehicle control device according to claim 1, wherein
the first state is a predetermined standard state,
the second state is a state different from the predetermined standard state.

13. The vehicle control device according to claim 12, wherein the second state is a state in which the object is falling down, the object is damaged, or the object is modified.

14. A vehicle control method causing a computer to perform:
recognizing a surrounding situation of a vehicle including a front vehicle traveling in front of the vehicle and an object presenting near the front vehicle;
controlling a speed and steering of the vehicle according to a result of the recognizing;
causing the vehicle to follow the front vehicle; and
causing the vehicle to stop following the front vehicle in response to determining that the front vehicle travels near the object at a first time and the object is in a first state at the first time, and a state of the object had changed from the first state to a second state different from the first state after the front vehicle passes the object at a second time after the first time in a case in which the vehicle is following the front vehicle,
wherein the object is a regulation sign for regulating a part of a lane in which a vehicle is traveling, a regulation sign for regulating a lane, or a guiding sign for guiding a visual line of an occupant of the vehicle.

15. A vehicle control device comprising:
a processor; and
a memory storing executable instructions that, when executed by the processor, facilitates performance of operations, comprising:
   recognizing a surrounding situation of a vehicle including a front vehicle traveling in front of the vehicle and an object presenting near the front vehicle,
   controlling a speed and steering of the vehicle according to a result of the recognizing,
   causing the vehicle to follow the front vehicle, and
   causing the vehicle to stop following the front vehicle in response to determining that a state of the object recognized in a traveling region through which the front vehicle has passed is different from a state of the object recognized in the traveling region immediately before the front vehicle has passed the object in a case in which the vehicle is following the front vehicle,
   wherein the object is a regulation sign for regulating a part of a lane in which a vehicle is traveling, a regulation sign for regulating a lane, or a guiding sign for guiding a visual line of an occupant of the vehicle.

16. The vehicle control device according to claim 15, wherein
   the state of the object recognized in the traveling region immediately before is a predetermined standard state, and
   the state of the object recognized in the traveling region through which the front vehicle has passed is a state different from the predetermined standard state.

17. The vehicle control device according to additional claim 16, wherein the state different from the predetermined standard state is a state in which the object is falling down, the object is damaged, or the object is modified.

* * * * *